US011370292B2

(12) United States Patent
Healy et al.

(10) Patent No.: US 11,370,292 B2
(45) Date of Patent: Jun. 28, 2022

(54) TRACTOR UNIT WITH ON-BOARD REGENERATIVE BRAKING ENERGY STORAGE FOR STOPOVER HVAC OPERATION WITHOUT ENGINE IDLE

(71) Applicant: Hyliion Inc., Cedar Park, TX (US)

(72) Inventors: Thomas Joseph Healy, South Easton, MA (US); Eric Weber, Pittsburgh, PA (US)

(73) Assignee: Hyliion Inc., Cedar Park, TX (US)

( * ) Notice: Subject to any disclaimer, the term of this patent is extended or adjusted under 35 U.S.C. 154(b) by 0 days.

(21) Appl. No.: 17/013,850

(22) Filed: Sep. 7, 2020

(65) Prior Publication Data
US 2020/0398657 A1 Dec. 24, 2020

Related U.S. Application Data

(62) Division of application No. 15/898,396, filed on Feb. 16, 2018, now Pat. No. 10,766,478.
(Continued)

(51) Int. Cl.
*B60W 20/14* (2016.01)
*B60K 6/48* (2007.10)
(Continued)

(52) U.S. Cl.
CPC ............. *B60K 6/48* (2013.01); *B60K 6/22* (2013.01); *B60K 6/40* (2013.01); *B60K 6/52* (2013.01);
(Continued)

(58) Field of Classification Search
CPC ...... B60L 7/10; B60L 7/12; B60L 7/14; B60L 7/16; B62D 59/02; B62D 59/04; B60W 10/24; B60W 20/13; B60K 2001/005
See application file for complete search history.

(56) References Cited

U.S. PATENT DOCUMENTS 3,860,081 A * 1/1975 Moll ..................... B62D 59/00
180/14.3
4,199,037 A 4/1980 White
(Continued)

FOREIGN PATENT DOCUMENTS

CA 2457216 A1 8/2004
EP 2985170 A2 2/2016
(Continued)

OTHER PUBLICATIONS

Karbowski, Sokolov, and Rousseau, "Vehicle Energy Management Optimisation through Digital Maps and Connectivity", 22nd ITS World Congress, ITS-1952, Bordeaux, France, Oct. 5-9, 2015.
(Continued)

*Primary Examiner* — Jeffrey J Restifo
(74) *Attorney, Agent, or Firm* — Baker Botts L.L.P.

(57) ABSTRACT

A through the road (TTR) hybridization strategy is proposed to facilitate introduction of hybrid electric vehicle technology in a significant portion of current and expected trucking fleets. In some cases, the technologies can be retrofitted onto an existing vehicle (e.g., a trailer, a tractor-trailer configuration, etc.). In some cases, the technologies can be built into new vehicles. In some cases, one vehicle may be built or retrofitted to operate in tandem with another and provide the hybridization benefits contemplated herein. By supplementing motive forces delivered through a primary drivetrain and fuel-fed engine with supplemental torque delivered at one or more electrically-powered drive axles, improvements in overall fuel efficiency and performance may be delivered, typically without significant redesign of existing components and systems that have been proven in the trucking industry.

18 Claims, 17 Drawing Sheets

Related U.S. Application Data

(60) Provisional application No. 62/460,734, filed on Feb. 17, 2017.

(51) Int. Cl.

| | | |
|---|---|---|
| *B60W 10/08* | (2006.01) | |
| *B60W 10/30* | (2006.01) | |
| *B60W 30/18* | (2012.01) | |
| *B60W 50/08* | (2020.01) | |
| *B60W 10/18* | (2012.01) | |
| *B60K 6/22* | (2007.10) | |
| *B60W 10/06* | (2006.01) | |
| *B60W 20/10* | (2016.01) | |
| *B60K 6/40* | (2007.10) | |
| *B60K 6/52* | (2007.10) | |
| *B60L 1/00* | (2006.01) | |
| *B60L 7/18* | (2006.01) | |
| *B60L 1/02* | (2006.01) | |
| *B60K 17/356* | (2006.01) | |
| *B60L 50/16* | (2019.01) | |
| *B60L 50/15* | (2019.01) | |
| *B60L 58/13* | (2019.01) | |
| *B60L 58/24* | (2019.01) | |
| *B60L 50/60* | (2019.01) | |
| *B60L 50/50* | (2019.01) | |

(52) U.S. Cl.
CPC ............ *B60K 17/356* (2013.01); *B60L 1/003* (2013.01); *B60L 1/02* (2013.01); *B60L 7/18* (2013.01); *B60L 50/15* (2019.02); *B60L 50/16* (2019.02); *B60L 50/50* (2019.02); *B60L 50/60* (2019.02); *B60L 58/13* (2019.02); *B60L 58/24* (2019.02); *B60W 10/06* (2013.01); *B60W 10/08* (2013.01); *B60W 10/18* (2013.01); *B60W 10/30* (2013.01); *B60W 20/10* (2013.01); *B60W 20/14* (2016.01); *B60W 30/18018* (2013.01); *B60W 30/18127* (2013.01); *B60W 50/082* (2013.01); *B60L 2200/28* (2013.01); *B60L 2200/36* (2013.01); *B60L 2200/46* (2013.01); *B60L 2240/12* (2013.01); *B60L 2240/14* (2013.01); *B60L 2240/26* (2013.01); *B60L 2240/423* (2013.01); *B60L 2240/443* (2013.01); *B60L 2240/463* (2013.01); *B60L 2240/62* (2013.01); *B60L 2240/64* (2013.01); *B60L 2240/66* (2013.01); *B60L 2240/68* (2013.01); *B60L 2250/26* (2013.01); *B60L 2260/26* (2013.01); *B60L 2260/28* (2013.01); *B60L 2270/40* (2013.01); *B60L 2270/46* (2013.01); *B60W 2300/126* (2013.01); *B60W 2300/14* (2013.01); *B60W 2300/145* (2013.01); *B60W 2510/0657* (2013.01); *B60W 2510/18* (2013.01); *B60W 2510/244* (2013.01); *B60W 2510/246* (2013.01); *B60W 2520/04* (2013.01); *B60W 2520/403* (2013.01); *B60W 2710/065* (2013.01); *B60W 2710/08* (2013.01); *B60W 2710/083* (2013.01); *B60W 2710/18* (2013.01); *B60W 2710/244* (2013.01); *B60W 2710/248* (2013.01); *B60W 2710/30* (2013.01); *B60W 2710/305* (2013.01); *B60W 2720/403* (2013.01); *B60Y 2200/147* (2013.01); *B60Y 2200/148* (2013.01); *B60Y 2300/18125* (2013.01); *B60Y 2300/28* (2013.01); *B60Y 2306/07* (2013.01); *Y02T 10/64* (2013.01); *Y02T 10/70* (2013.01); *Y02T 10/7072* (2013.01); *Y02T 10/72* (2013.01); *Y02T 90/16* (2013.01); *Y10S 903/93* (2013.01); *Y10S 903/947* (2013.01)

(56) References Cited

U.S. PATENT DOCUMENTS

| | | | | |
|---|---|---|---|---|
| 5,178,403 | A * | 1/1993 | Kemner | B61D 49/00 |
| | | | | 280/423.1 |
| 5,488,352 | A * | 1/1996 | Jasper | H01R 13/6633 |
| | | | | 340/431 |
| 5,559,420 | A | 9/1996 | Kohchi | |
| 6,390,215 | B1 * | 5/2002 | Kodama | B60L 50/62 |
| | | | | 180/65.22 |
| 6,516,925 | B1 * | 2/2003 | Napier | B60T 1/10 |
| | | | | 188/112 A |
| 7,147,070 | B2 * | 12/2006 | Leclerc | B60K 1/04 |
| | | | | 180/14.2 |
| 7,338,335 | B1 * | 3/2008 | Messano | B62D 35/001 |
| | | | | 180/65.22 |
| 7,520,354 | B2 * | 4/2009 | Morrow | B60K 17/046 |
| | | | | 180/65.31 |
| 8,058,982 | B2 * | 11/2011 | Crowe | B60W 10/08 |
| | | | | 340/455 |
| 8,327,960 | B2 | 12/2012 | Couture et al. | |
| 8,627,908 | B2 | 1/2014 | Wellborn et al. | |
| 8,776,928 | B2 * | 7/2014 | Stover, Jr. | B60H 1/3222 |
| | | | | 180/165 |
| 9,108,691 | B2 * | 8/2015 | Fanourakis | B62D 53/0871 |
| 9,162,671 | B2 * | 10/2015 | Itoh | B60L 50/16 |
| 9,193,339 | B2 * | 11/2015 | Yao | B60T 8/3215 |
| 9,321,357 | B2 * | 4/2016 | Caldeira | B60L 50/53 |
| 9,457,666 | B2 * | 10/2016 | Caldeira | B60L 58/20 |
| 9,604,627 | B2 * | 3/2017 | Yamanaka | B60W 10/30 |
| 9,694,712 | B2 * | 7/2017 | Healy | B60L 7/18 |
| 9,751,522 | B2 * | 9/2017 | White | B60W 20/15 |
| 9,887,570 | B2 | 2/2018 | Johnsen et al. | |
| 9,937,819 | B2 * | 4/2018 | Healy | B60L 7/18 |
| 9,948,136 | B2 * | 4/2018 | Doane | H02J 7/35 |
| 10,150,358 | B2 * | 12/2018 | Soto | B60K 15/10 |
| 10,245,972 | B2 * | 4/2019 | Healy | B60L 53/53 |
| 10,384,560 | B2 * | 8/2019 | Healy | B60L 7/18 |
| 10,449,954 | B2 * | 10/2019 | Layfield | B60W 10/08 |
| 10,500,975 | B1 * | 12/2019 | Healy | B60L 58/10 |
| 10,518,662 | B2 * | 12/2019 | Schumacher | B60L 3/0092 |
| 10,518,831 | B2 * | 12/2019 | Wright | B60L 7/10 |
| 10,596,913 | B2 * | 3/2020 | Healy | B60L 50/53 |
| 10,752,102 | B2 * | 8/2020 | Lampsa | B60K 1/04 |
| 10,766,478 | B2 * | 9/2020 | Healy | B60K 6/22 |
| 10,821,853 | B2 * | 11/2020 | Healy | B60W 10/06 |
| 10,889,288 | B2 * | 1/2021 | Richter | B60W 20/20 |
| 11,046,192 | B2 * | 6/2021 | Aufdencamp | B60L 50/64 |
| 11,046,302 | B2 * | 6/2021 | Richter | B60K 6/52 |
| 11,091,133 | B2 * | 8/2021 | Healy | B60T 1/10 |
| 11,094,988 | B2 * | 8/2021 | Richter | B60W 10/08 |
| 2002/0038730 | A1 | 4/2002 | Bidwell | |
| 2002/0056579 | A1 * | 5/2002 | Cooper | B62D 59/04 |
| | | | | 180/14.2 |
| 2004/0002794 | A1 | 1/2004 | Pillar et al. | |
| 2005/0045058 | A1 | 3/2005 | Donnelly et al. | |
| 2005/0060079 | A1 | 3/2005 | Phillips et al. | |
| 2007/0193795 | A1 | 8/2007 | Forsyth | |
| 2008/0023234 | A1 | 1/2008 | Wang | |
| 2008/0169144 | A1 * | 7/2008 | DeGrave | B60L 7/08 |
| | | | | 180/165 |
| 2008/0174174 | A1 * | 7/2008 | Burns | B60W 20/13 |
| | | | | 303/152 |
| 2009/0223725 | A1 * | 9/2009 | Rodriguez | B60L 7/14 |
| | | | | 180/65.21 |
| 2010/0065344 | A1 | 3/2010 | Collings, III | |
| 2010/0224430 | A1 * | 9/2010 | Bennett, Sr. | B60K 6/52 |
| | | | | 180/65.51 |
| 2010/0252339 | A1 * | 10/2010 | Bibeau | B60L 50/53 |
| | | | | 180/12 |
| 2010/0282122 | A1 | 11/2010 | Mai | |
| 2011/0042154 | A1 | 2/2011 | Bartel | |

(56) References Cited

U.S. PATENT DOCUMENTS

| | | | |
|---|---|---|---|
| 2011/0094807 A1* | 4/2011 | Pruitt | B60K 17/36 |
| | | | 180/65.6 |
| 2011/0320078 A1 | 12/2011 | McGill | |
| 2012/0167555 A1 | 7/2012 | Frazier | |
| 2013/0190998 A1 | 7/2013 | Polimeno et al. | |
| 2013/0204501 A1* | 8/2013 | Keeney | B60W 30/18127 |
| | | | 701/70 |
| 2013/0338848 A1 | 12/2013 | Park | |
| 2014/0025245 A1* | 1/2014 | Fanourakis | B62D 53/06 |
| | | | 701/22 |
| 2014/0116077 A1 | 5/2014 | Pierce et al. | |
| 2015/0204741 A1* | 7/2015 | Hagan | B60W 10/08 |
| | | | 180/11 |
| 2015/0298680 A1 | 10/2015 | Matthews | |
| 2015/0298684 A1 | 10/2015 | Schwartz et al. | |
| 2016/0014252 A1 | 1/2016 | Biderman et al. | |
| 2016/0031435 A1 | 2/2016 | Gibson et al. | |
| 2016/0061611 A1 | 3/2016 | Meyer et al. | |
| 2016/0137204 A1 | 5/2016 | Morselli | |
| 2016/0318421 A1* | 11/2016 | Healy | B60L 58/10 |

FOREIGN PATENT DOCUMENTS

| | | |
|---|---|---|
| WO | 2005012025 A1 | 2/2005 |
| WO | 2015052567 A1 | 4/2015 |
| WO | 2018064619 A3 | 5/2018 |

OTHER PUBLICATIONS

KURAL and GUVENC, "Predictive-Eguivalent Consumption Minimization Strategy for Energy Management of a Parallel Hybrid Vehicle for Optimal Recuperation", Journal of Polytechnic, 18(3), pp. 113-124, 2015, Diqital Object Identifier: 10.2339/2015.18.3, 113-124.

Lin, Kang, Grizzle, and Peng, "Energy Management Strategy for a Parallel Hybrid Electric Truck", Proceedings of the American Control Conference, 2001, pp. 2878-2883, Digital Object Identifier: 10.1109/ACC.2001.946337.

Musardo, Rizzoni, and Staccia, "A-ECMS: An Adaptive Algorithm for Hybrid Electric Vehicle Energy Manaqement", Proceedings of the 44th IEEE Conference on Decision and Control, 2005, oo. 1816-1823.

Paganelli, Delprat, Guerra, Rimaux, and Santin, "Equivalent Consumption Minimization Strategy for Parallel Hybrid Powertrains", Proceedings of the IEEE 55th Vehicular Technology Conference, 2002, pp. 2076-2081.

Sciarretta and Guzzella, "Control of Hybrid Electric Vehicles", IEEE Control Systems Magazine, vol. 27, No. 2, pp. 60-70, Apr. 2007.

Sciarretta, Back, and Guzzella, "Optimal Control of Parallel Hybrid Electric Vehicles", IEEE Transactions on Control Systems Technology, vol. 12, No. 3, pp. 352-363, May 2004.

Skugor, Pavkovic, and Deur, "A Series-Parallel Hybrid Electric Vehicle Control Strategy Including Instantaneous Optimization of Equivalent Fuel Consumption", IEEE International Conference on Control Applications, pp. 310-316, 2012.

Zulkifli, Mohd, Saad, and Aziz, "Operation and Control of Split-Parallel, Through-The-Road Hybrid Electric Vehicle With In-Wheel Motors", International Journal of Automotive and Mechanical Engineering, vol. 11, pp. 2793-2808, 2015, Digital Object Identifier: 10.15282/ijame.11.2015.54.0235.

Zulkifli, S.A.: "Split-Parallel Through-the-Road Hybrid Electric Vehicle: Operation, Power Flow and Control Modes", 2015 IEEE Transportation Electrification Conference and Expo (ITEC), Jun. 17, 2015 (Jun. 17, 2015), pai:ies 107.

PCT International Search Report and Written Opinion, Application No. PCT/US2016/030482, dated Aug. 4, 2016.

PCT International Search Report, Application No. PCT/US2017/054587, dated Apr. 20, 2018.

PCT International Search Report, Application No. PCT/US2018/018499, dated May 22, 2018.

European Search Report, Application No. 16789915.2, dated Jan. 8, 2018.

PCT International Search Report and Written Opinion, Application No. PCT/US2017/054595, dated Feb. 8, 2018.

* cited by examiner

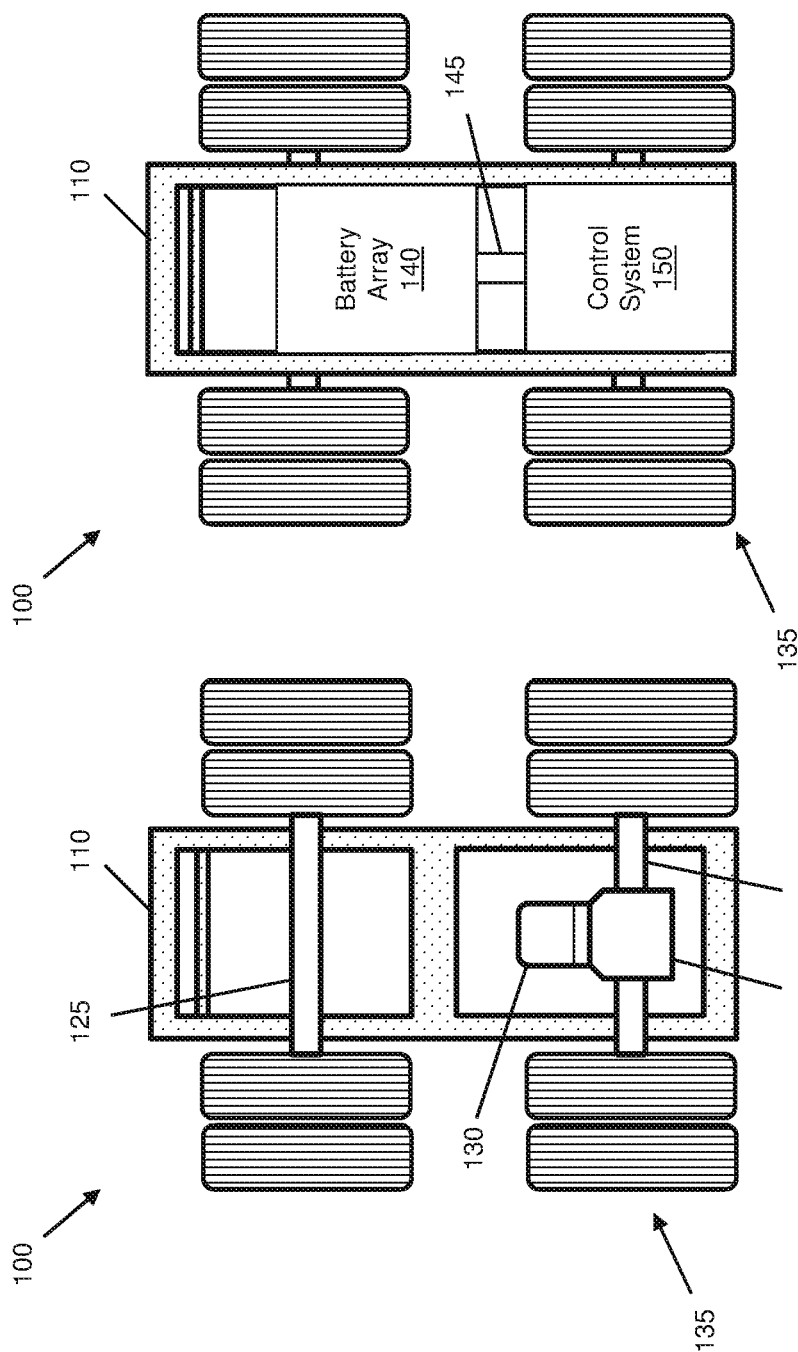

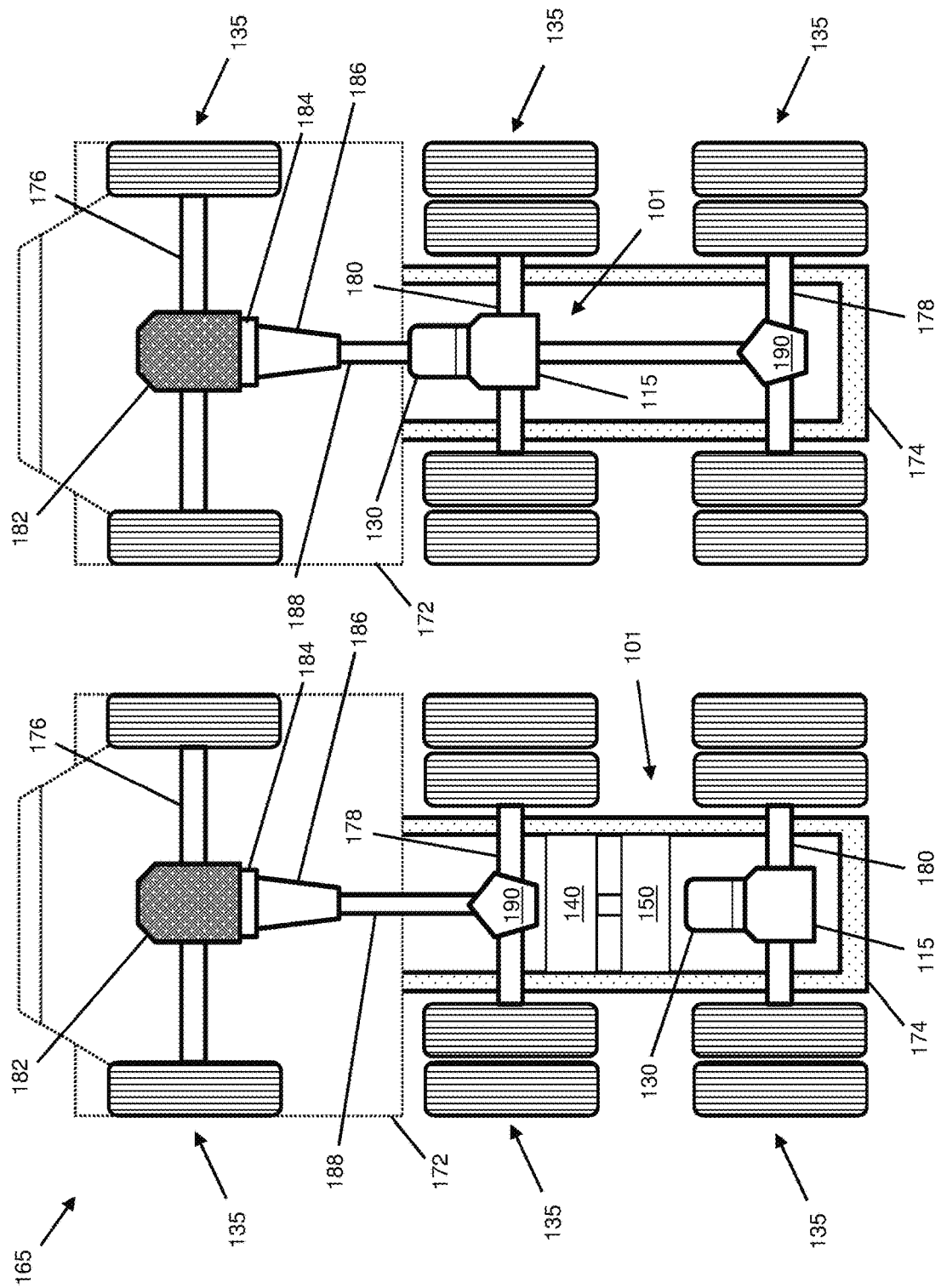

| SEVCON | | |
|---|---|---|
| IG POWER | 1 | OR |
| HV CONTACTOR OUT | 2 | GN |
| PRE-CHARGE RELAY | 3 | OR |
| | 4 | |
| | 5 | |
| | 6 | |
| RESOLVER EX- | 7 | BK |
| RESOLVER EX+ | 8 | GR |
| | 9 | |
| CAN GND | 10 | BK |
| CAN HI | 11 | YL |
| CAN HI | 12 | WH |
| LOGIC '0' | 13 | BK |
| PULSE DIG. OUT | 14 | YL |
| FWD SWITCH | 15 | BL |
| | 16 | |
| THROTTLE POT | 17 | WT |
| BRAKE POT | 18 | WT |
| SIN HI | 19 | GR |
| COS HI | 20 | GR |
| ENCODER -12V | 21 | BK |
| CAN LO | 22 | GR |
| CAN LO | 23 | BK |
| COIL SUPPLY | 24 | VT |
| FWD SWITCH (F) | 25 | BL |
| | 26 | |
| PULSE ENABLE IN | 27 | OR |
| MOTOR TEMP | 28 | VT |
| THROTTLE 5Vdc | 29 | RE |
| BRAKE 5Vdc | 30 | RE |
| SIN LO | 31 | BK |
| COS LO | 32 | BK |
| | 33 | |
| | 34 | |
| | 35 | |

FIG. 2A

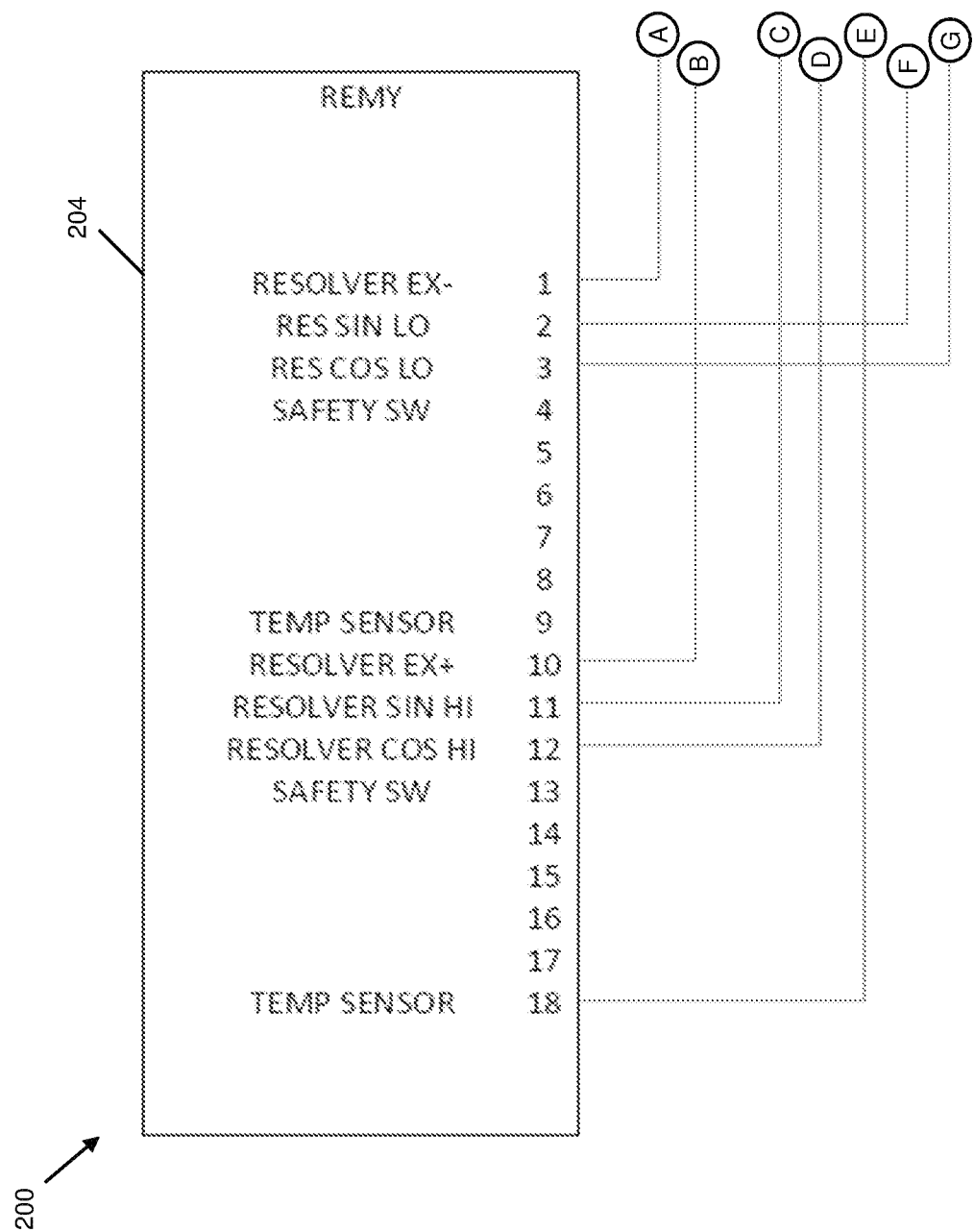

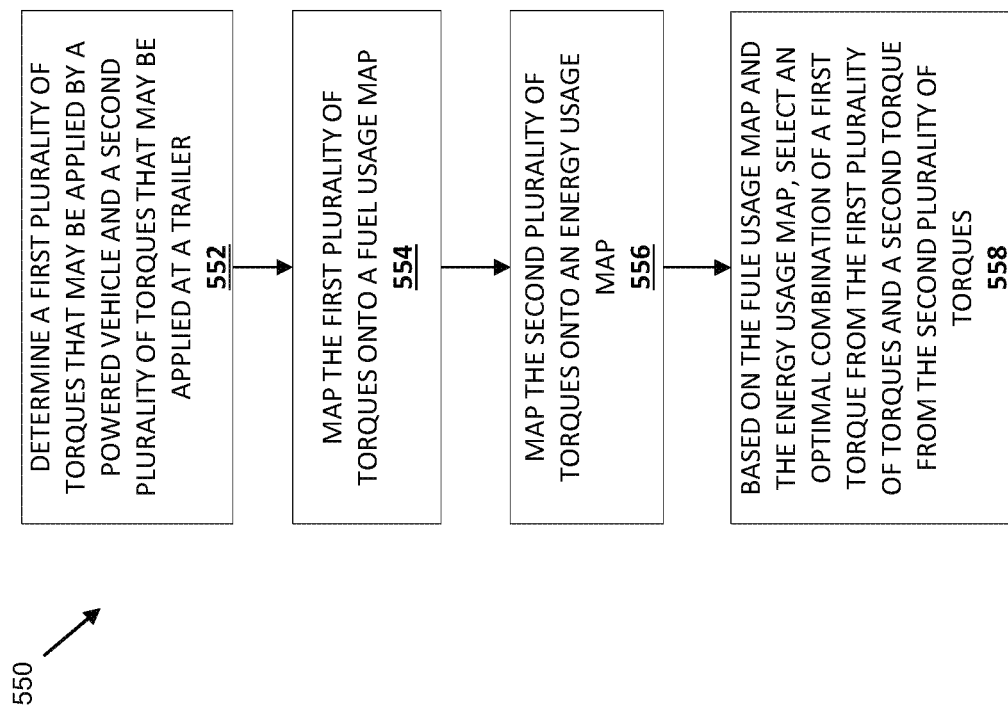

TRACTOR UNIT WITH ON-BOARD REGENERATIVE BRAKING ENERGY STORAGE FOR STOPOVER HVAC OPERATION WITHOUT ENGINE IDLE

CROSS-REFERENCE TO RELATED APPLICATIONS

This application is divisional of U.S. patent application Ser. No. 15/898,396, filed Feb. 16, 2018, which claims priority to U.S. Provisional Patent Application No. 62/460,734 filed Feb. 17, 2017, the entire disclosures of which are incorporated by reference herein.

The present application is related to U.S. Provisional Application No. 62/403,000, filed Sep. 30, 2016, entitled "VEHICLE THERMAL MANAGEMENT SYSTEM AND RELATED METHODS," naming Thomas Joseph Healy and Eric Weber as inventors. The present application is also related to the following applications each filed May 2, 2016, each entitled "MOTOR VEHICLE ACCESSORY TO INCREASE POWER SUPPLY AND REDUCE FUEL REQUIREMENTS", and each naming Thomas Joseph Healy as inventor: (1) U.S. application Ser. No. 15/144,769; (2) U.S. application Ser. No. 15/144,775; and (3) International Application No. PCT/US2016/030482. Each of the aforementioned applications is incorporated by reference herein.

BACKGROUND

Field of the Invention

The invention relates generally to hybrid vehicle technology, and in particular to a system and method to intelligently control regeneration and reuse of captured energy.

Description of the Related Art

Every year the U.S. trucking industry consumes 51 billion gallons of fuel, accounting for over 30% of overall industry operating costs. In addition, the trucking industry spends over $100 billion on fuel annually, and the average fuel economy of a tractor-trailer (e.g., an 18-wheeler) is about 6.5 miles per gallon. For trucking fleets faced with such large fuel costs, any way to offset those costs would be worth considering. Hybrid technology has been in development for use in the trucking industry for some time, and some hybrid trucks have entered the market. However, existing systems are generally focused on hybridizing the tractor, while any attached trailer remains a passive load. Thus, the extent to which the fuel efficiency of a tractor-trailer may be improved is limited to the extent to which the fuel efficiency of the hybrid tractor is improved. Therefore, improved techniques and functional capabilities are desired.

SUMMARY

In some embodiments of the present invention, a vehicle includes: a vehicle frame; a fuel-fed engine and plural drive axles attached to the vehicle frame, wherein at least one of the drive axles is coupled via a drivetrain to the fuel-fed engine to drive at least a pair of wheels; at least one other of the drive axles being an electrically-powered drive axle configured to supply supplemental torque to one or more additional wheels of the vehicle and to thereby supplement, while the vehicle travels over a roadway and in at least some modes of operation, primary motive forces applied through the drivetrain; an energy store on the vehicle, the energy store configured to supply the electrically powered drive axle with electrical power and further configured to receive energy recovered using the drive axle in a regenerative braking mode of operation; and a heating, ventilation or cooling (HVC) system on the vehicle, the heating, ventilation or cooling system coupled to receive electrical power from the energy store, wherein for stopover operation and without idling of the fuel-fed engine, the energy store powers the HVC system In some embodiments, the vehicle is a tractor unit for use in a tractor-trailer vehicle configuration, and the HVC system is an auxiliary system, substantially separate from a main heating ventilating or cooling system of the vehicle, configured to regulate temperature within at least a portion of a cabin of the tractor unit during stopover and without idling of the fuel-fed engine.

In some embodiments, the tractor unit is a 6×2 tractor unit retrofitted to replace an otherwise dead axle of a tandem pair with the electrically-powered drive axle.

In some embodiments, the retrofitted electrically-powered drive axle is coupled to a brake line of the tractor unit for control of the regenerative braking mode of operation.

In some embodiments, the energy store includes: a battery; a battery management system for controllably maintaining a desired state of charge (SoC) of the energy store during the over-the-roadway travel; and a heat exchanger for at least moderating temperature of the battery during the over-the-roadway travel.

In some embodiments, the heat exchanger includes a fluid-air heat exchanger exposed to airflow during over-the-roadway travel and coupled into a compressor-based loop for subambient cooling of the battery at least during the over-the-roadway travel, the compressor-based loop further coupled to supply subambient cooling to the cabin of the tractor unit, at least selectively during the stopover operation, via a fluid-air heat exchanger of the HVC system.

In some embodiments, the energy store further includes at least one additional electrical storage device having discharge rate and/or capacity characteristics that differ from the battery; and the battery management system controllably maintains the desired SoC including states of charge of the battery and of the at least one additional electrical storage device.

In some embodiments, the at least one additional electrical storage device includes either or both of an ultracapacitor and additional battery-type storage.

In some embodiments, the vehicle further includes an in-cabin control interface coupled to the battery management system, the control interface including: an in-cabin display of state of charge for the energy store; and mode control for selectively controlling an operating mode of the battery management system, wherein in at least one selectable mode, energy recovered using the electrically-powered drive axle in the regenerative braking mode is used to bring the energy store to a substantially full state of charge, and wherein in at least another selectable mode, state of charge is managed to a dynamically varying level based on actual or predicted requirements for supplemental motive forces during over-the-roadway travel.

In some embodiments, the vehicle further includes: an inverter coupled between the energy store and an in-cabin electrical power interface to supply auxiliary AC power in the cabin of the vehicle during stopover operation and without idling of the fuel-fed engine.

In some embodiments of the present invention, a tractor for use in a tractor-trailer vehicle configuration includes: at least one electrically-powered drive axle coupled to a frame of the tractor and configured to supply supplemental torque to one or more wheels of the tractor, while the vehicle travels over a roadway and in at least some modes of operation; a battery on the tractor, the battery configured to supply the electrically-powered drive axle with electrical power and further configured to receive energy recovered using the electrically-powered drive axle in a regenerative braking mode of operation; and a heating, ventilation or cooling (HVC) system on the vehicle, the heating, ventilation or cooling system coupled to receive electrical power from the battery.

In some embodiments, the tractor further includes: at least one fuel-fed engine powered drive axle coupled to the frame of the tractor, wherein the at least one fuel-fed engine powered drive axle is coupled via a drive shaft to a fuel-fed engine to drive at least a pair of wheels and to thereby provide primary motive forces.

In some embodiments, the HVC system is an auxiliary system, substantially separate from a main heating ventilating or cooling system of the tractor, configured to regulate temperature within at least a portion of a cabin of the tractor unit during stopover and without idling of the fuel-fed engine.

In some embodiments, the tractor is a 6×2 tractor unit retrofitted to replace an otherwise dead axle of a tandem pair with the electrically-powered drive axle.

In some embodiments, the retrofitted electrically-powered drive axle is coupled to a brake line of the tractor unit for control of the regenerative braking mode of operation.

In some embodiments, the tractor further includes: a battery management system for controllably maintaining a desired state of charge (SoC) of the battery array during the over-the-roadway travel; and a heat exchanger for at least moderating temperature of the battery during the over-the-roadway travel.

In some embodiments, the tractor further includes an in-cabin control interface coupled to the battery management system, the control interface including: an in-cabin display of state of charge for the battery array; and mode control for selectively controlling an operating mode of the battery management system, wherein in at least one selectable mode, energy recovered using the electrically-powered drive axle in the regenerative braking mode is used to bring the battery array to a substantially full state of charge, and wherein in at least another selectable mode, state of charge is managed to a dynamically varying level based on actual or predicted requirements for supplemental motive forces during over-the-roadway travel.

In some embodiments of the present invention, a method includes: supplying supplemental torque to one or more wheels of a vehicle for use in a tractor-trailer vehicle configuration using an electrically powered drive axle on the vehicle to supplement, while the vehicle travels over a roadway and in at least some modes of operation, primary motive forces applied through a separate drivetrain of the vehicle; supplying the electrically powered drive axle with electrical power from an energy store on the vehicle, the energy store configured to receive and store energy recovered using the electrically powered drive axle in a regenerative braking mode of operation; and supplying electrical power from the energy store to a heating, ventilation or cooling (HVC) system on the vehicle.

In some embodiments, the vehicle is a 6×2 tractor unit retrofitted to replace an otherwise dead axle of a tandem pair with the electrically-powered drive axle.

In some embodiments, the energy store includes: a battery; a battery management system for controllably maintaining a desired state of charge (SoC) of the energy store during the over-the-roadway travel; and a heat exchanger for at least moderating temperature of the battery during the over-the-roadway travel.

BRIEF DESCRIPTION OF THE DRAWINGS

The present invention is illustrated by way of example and not limitation with reference to the accompanying figures, in which like references generally indicate similar elements or features.

FIG. 1A depicts a bottom view of a hybrid suspension system, in accordance with some embodiments;

FIG. 1B depicts a top view of the hybrid suspension system, in accordance with some embodiments;

FIG. 1D depicts a bottom view of the adapted hybrid system, in accordance with some embodiments;

FIG. 1E depicts a bottom view of an alternative embodiment of the adapted hybrid system, in accordance with some embodiments;

FIGS. 2A-2F illustrate a control system circuit, which may be housed within the hybrid suspension system of FIGS. 1A and 1B, or within the adapted hybrid system of FIGS. 1D and 1E, in accordance with some embodiments;

FIG. 5B is a flow diagram providing an aspect of the method of FIG. 5A for controlling the hybrid suspension system and/or the adapted hybrid system, in accordance with some embodiments;

Figure 1C:
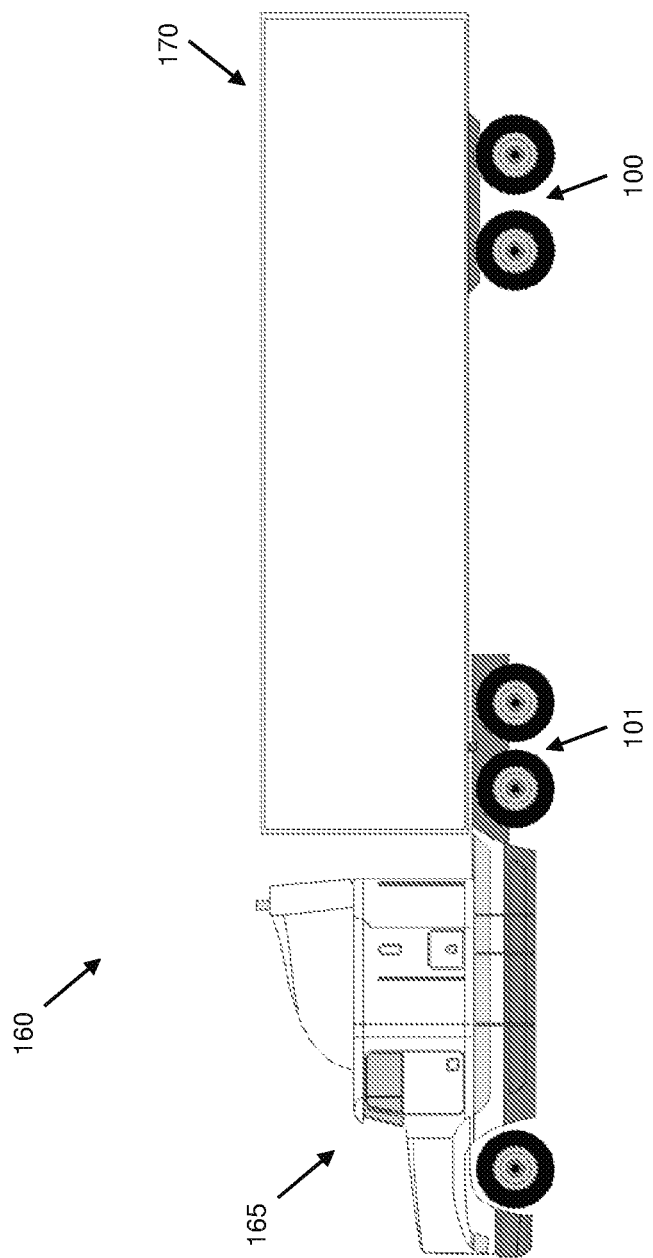
FIG. 1C depicts an exemplary tractor-trailer vehicle, including the hybrid suspension system and an adapted hybrid system, in accordance with some embodiments.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present disclosure provides systems and methods for providing an energy management system and related methods. In particular, embodiments of the present disclosure provide a hybridized suspension assembly that may be coupled underneath a trailer, for example, as a replacement to a passive suspension assembly. In various examples, the trailer may be towed by a powered vehicle, such as a fuel-consuming tractor. As described in more detail below, the hybridized suspension assembly operates independently of the powered vehicle and is configured to operate in at least one of a power assist mode, a regeneration mode, and a passive mode. By effectively collecting and processing a variety of sensor data, telematics data, and/or other relevant data, embodiments of the present disclosure further provide intelligent control methods to simultaneously optimize fuel consumption of the powered vehicle, as well as energy consumption of the hybrid suspension assembly. Among other advantages, embodiments disclosed herein provide for a significant reduction in fuel consumption (e.g., an average of about 30%), a built-in auxiliary power unit (APU), enhanced stability control, improved trailer dynamics, and a host of other benefits, at least some of which are described in more detail below.

Hybrid Suspension System

Referring now to FIGS. 1A and 1B, illustrated therein is a hybrid suspension system 100. As described in more detail below, the hybrid suspension system 100 may include a frame 110, a suspension, one or more drive axles (e.g., such as a drive axle 120), at least one electric motor-generator (e.g., such as an electric-motor generator 130) coupled to the at least one or more drive axles, an energy storage system (e.g., such as a battery array 140), and a controller (e.g., such as a control system 150). In accordance with at least some embodiments, the hybrid suspension system 100 is configured for attachment beneath a trailer. As used herein, the term "trailer" is used to refer to an unpowered vehicle towed by a powered vehicle. In some cases, the trailer may include a semi-trailer coupled to and towed by a truck or tractor (e.g., a powered towing vehicle). By way of example, FIG. 1C illustrates a tractor-trailer vehicle 160 that includes a tractor 165 coupled to and operable to tow a trailer 170. In particular, and in accordance with embodiments of the present disclosure, the hybrid suspension system 100 is coupled underneath the trailer 170, as a replacement to a passive suspension assembly, as discussed in more detail below. For purposes of this discussion, the tractor 165 may be referred to generally as a "powered towing vehicle" or simply as a "powered vehicle".

To be sure, embodiments of the present disclosure may equally be applied to other types of trailers (e.g., utility trailer, boat trailer, travel trailer, livestock trailer, bicycle trailer, motorcycle trailer, a gooseneck trailer, flat trailer, tank trailer, farm trailer, or other type of unpowered trailer) towed by other types of powered towing vehicles (e.g., pickup trucks, automobiles, motorcycles, bicycles, buses, or other type of powered vehicle), without departing from the scope of this disclosure. In various embodiments, the powered towing vehicles may further include vehicles utilizing a variety of technologies and fuel types such as diesel, gasoline, propane, biodiesel, ethanol (E85), compressed natural gas (CNG), hydrogen internal combustion engine (ICE), homogeneous charge compression ignition (HCCI) engine, hydrogen fuel cell, hybrid electric, plug-in hybrid, battery electric, and/or other type of fuel/technology. Regardless of the type of technology and/or fuel type, the powered towing vehicle may have a particular fuel efficiency. As described below, and among other advantages, embodiments of the present disclosure provide for improved fuel efficiency of the powered towing vehicle, as described in more detail herein. More generally, and in accordance with various embodiments, the hybrid suspension system 100 described herein is configured for use with any type of trailer or powered towing vehicle. In addition, the hybrid suspension system 100 is configured to operate autonomously from the powered towing vehicle. As used herein, "autonomous" operation of the hybrid suspension system 100 is used to describe an ability of the hybrid suspension system 100 to operate without commands or signals from the powered towing vehicle, to independently gain information about itself and the environment, and to make decisions and/or perform various functions based on one or more algorithms stored in the controller, as described in more detail below.

A trailer, as typically an unpowered vehicle, includes one or more passive axles. By way of example, embodiments of the present disclosure provide for replacement of the one or more passive trailer axles with one or more powered axles. For example, in at least some embodiments, the hybrid suspension system 100 may replace a passive tandem axle with a powered tandem axle, as shown in the example of FIG. 1C. In accordance with the present disclosure, the hybrid suspension system 100 is configured to provide, in a first mode of operation, a motive rotational force (e.g., by an electric motor-generator coupled to a drive axle) to propel the hybrid suspension system 100, and thus the trailer under which is attached, thereby providing an assistive motive force to the powered towing vehicle. Thus, in some examples, the first mode of operation may be referred to as a "power assist mode". Additionally, in some embodiments, the hybrid suspension system 100 is configured to provide, in a second mode of operation, a regenerative braking force (e.g., by the electric motor-generator coupled to the drive axle) that charges an energy storage system (e.g., the battery array). Thus, in some examples, the second mode of operation may be referred to as a "regeneration mode". In some examples, the hybrid suspension system 100 is further configured to provide, in a third mode of operation, neither motive rotational nor regenerative braking force such that the trailer and the attached hybrid suspension system 100 are solely propelled by the powered towing vehicle to which the trailer is coupled. Thus, in some examples, the third mode of operation may be referred to as a "passive mode".

In providing powered axle(s) to the trailer (e.g., by the hybrid suspension system 100), embodiments of the present disclosure result in a significant reduction in both fuel consumption and any associated vehicle emissions, and thus a concurrent improvement in fuel efficiency, of the powered towing vehicle. In addition, various embodiments may provide for improved vehicle acceleration, vehicle stability, and energy recapture (e.g., via regenerative braking) that may be used for a variety of different purposes. For example, embodiments disclosed herein may use the recaptured energy to apply the motive rotational force using the electric motor-generator and/or provide on-trailer power that may be used for powering a lift gate, a refrigeration unit, a heating ventilation and air conditioning (HVAC) system, pumps, lighting, communications systems, and/or providing an auxiliary power unit (APU), among others. It is noted that the above advantages and applications are merely exemplary, and additional advantages and applications will become apparent to those skilled in the art upon review of this disclosure.

Referring again to FIG. 1A, illustrated therein is a bottom view of the hybrid suspension system 100 which shows the frame 110, the drive axle 120, a passive axle 125, and wheels/tires 135 coupled to ends of each of the drive axle 120 and the passive axle 125. In addition, the electric motor-generator 130 is coupled to the drive axle 120 by way of a differential 115, thereby allowing the electric motor generator 130 to provide the motive rotational force in the first mode of operation, and to charge the energy storage system (e.g., the battery array) by regenerative braking in the second mode of operation. While shown as having one drive axle and one passive axle, in some embodiments, the hybrid suspension system 100 may have any number of axles, two or more drive axles, as well as multiple electric-motor generators on each drive axle. In addition, axles of the hybrid suspension system (e.g., the drive axle 120 and the passive axle 125) may be coupled to the frame 110 by a leaf spring suspension, an air suspension, a fixed suspension, a sliding suspension, or other appropriate suspension. In some embodiments, the wheels/tires 135 coupled to ends of one or both of the drive axle 120 and the passive axle 125 may be further coupled to a steering system (e.g., such as a manual or power steering system), thereby providing for steering of the hybrid suspension system 100 in a desired direction.

With reference to FIG. 1B, illustrated therein is a top view of the hybrid suspension system 100 showing the battery array 140 and the control system 150. In various embodiments, the battery array 140 and the control system 150 may be coupled to each other by an electrical coupling 145. In addition, the electric motor-generator 130 may be coupled to the control system 150 and to the battery array 140, thereby providing for energy transfer between the battery array 140 and the electric motor-generator 130. In various examples, the battery array 140 may include one or more of an energy dense battery and a power dense battery. For example, in some embodiments, the battery array 140 may include one or more of a nickel metal hydride (NiMH) battery, a lithium ion (Li-ion) battery, a lithium titanium oxide (LTO) battery, a nickel manganese cobalt (NMC) battery, a supercapacitor, a lead-acid battery, or other type of energy dense and/or power dense battery.

In some embodiments, one or more aspects of the hybrid suspension system 100 may be adapted for use as part of the tractor 165. With reference to FIG. 1C, and in some embodiments, such an adapted hybrid system 101 may include various aspects of the hybrid suspension system 100, as described above, which are coupled to and/or integrated with existing components of the tractor 165 to provide the adapted hybrid system 101. In some examples, the adapted hybrid system 101 may provide for replacement of the one or more passive axles of the tractor 165 with one or more powered axles. Thus, in various embodiments, the adapted hybrid system 101 may be used to provide a motive rotational force (e.g., in a first mode, or power assist mode, of operation) to the powered towing vehicle (e.g., to the tractor 165). Additionally, in some embodiments, the adapted hybrid system 101 is configured to provide a regenerative braking force (e.g., in a second mode, or regeneration mode, of operation) that charges an energy storage system (e.g., the battery array). In some examples, the adapted hybrid system 101 is further configured to provide neither motive rotational nor regenerative braking force (e.g., in a third mode, or passive mode, of operation).

It is noted that the adapted hybrid system 101 may be used separately and independently from the hybrid suspension system 100 attached to the trailer. Thus, for example, advantages of the various embodiments disclosed herein (e.g., reduced fuel consumption and emissions, improved fuel efficiency, vehicle acceleration, vehicle stability, and energy recapture) may be realized by the adapted hybrid system 101 apart from the hybrid suspension system 100. This may be advantageous, for instance, when the tractor 165 is driven without the attached trailer. To be sure, when the tractor 165 is used to tow a trailer and in some embodiments, the hybrid suspension system 100 and the adapted hybrid system 101 may be cooperatively operated to provide a greater motive rotational force to, or recapture a greater amount of energy from, the tractor-trailer vehicle 160 than either of the hybrid suspension system 100 or the adapted hybrid system 101 may be able to provide or recapture on their own. In at least some embodiments, the adapted hybrid system 101 may be independently used (e.g., apart from the hybrid suspension system 100) to recapture energy that can subsequently be used to provide power to tractor 165 systems and/or to trailer systems. For example, such power may be used to power a lift gate, a refrigeration unit, a heating ventilation and air conditioning (HVAC) system, pumps, lighting, communications systems, and/or to provide an auxiliary power unit (APU), among others.

With reference to FIG. 1D, illustrated therein is a bottom view of the adapted hybrid system 101 coupled to and/or integrated with the tractor 165. As shown, the tractor 165 may include a cab 172, a frame 174, a steering axle 176, an engine-powered axle 178, an electric axle 180, and wheels/tires 135 coupled to ends of each of the steering axle 176, the engine-powered axle 178, and the electric axle 180. A steering wheel may be coupled to the steering axle 176 to turn and/or otherwise control a direction of travel of the tractor 165. In various embodiments, the tractor 165 further includes an engine 182, a torque converter 184 coupled to the engine 182, a transmission 186 coupled to the torque converter 184, a drive shaft 188 coupled to the transmission 186, and a differential 190 coupled to the drive shaft 188. The differential 190 may be further coupled to the engine-powered axle 178, thereby providing torque to the wheels coupled to ends of the engine-powered axle 178. As part of the adapted hybrid system 101, and in various embodiments, the electric motor-generator 130 may be coupled to the electric axle 180 by way of the differential 115, thereby allowing the electric motor-generator 130 to provide the motive rotational force in the first mode of operation, and to charge the energy storage system (e.g., the battery array) by regenerative braking in the second mode of operation. In some embodiments, the electric axle 180 may include multiple electric-motor generators coupled thereto. As shown in FIG. 1D, the adapted hybrid system 101 may also include the battery array 140 and the control system 150, for example, coupled to each other by an electrical coupling, thereby providing for energy transfer between the battery array 140 and the electric motor-generator 130. The battery array 140 may include any of a variety of battery types, as described above.

Referring to FIG. 1E, illustrated therein is a bottom view of an alternative embodiment of the adapted hybrid system 101 coupled to and/or integrated with the tractor 165. In particular, in the example of FIG. 1D, the engine-powered axle 178 is disposed between the steering axle 176 and the electric axle 180, which is disposed at a back end (e.g., opposite the cab 172) of the tractor 165. Alternatively, in the example of FIG. 1E, the electric axle 180 is disposed between the steering axle 176 and the engine-powered axle 178, which is disposed at a back end (e.g., opposite the cab 172) of the tractor 165. While not shown in FIG. 1E for clarity of illustration, the adapted hybrid system 101 provided therein may also include the battery array 140 and the control system 150, as described above. It is also noted that FIG. 1D and FIG. 1E illustrate a 6×2 tractor unit, where the electric axle 180 replaces what would have been an otherwise dead axle of the tandem pair of rear axles.

Control System Architecture and Components

As discussed above, the hybrid suspension system 100 and/or the adapted hybrid system 101 are configured to operate autonomously and in at least three modes of operation: (i) a power assist mode, (ii) a regeneration mode, and (iii) a passive mode. In particular, and in various embodiments, the hybrid suspension system 100 and/or the adapted hybrid system 101 are operated in one of these three modes by way of the control system 150 (e.g., in conjunction with a suitable program code, as discussed below). Various aspects of the control system 150, including system architecture and exemplary components, are described in more detail below with reference to FIGS. 2A-2F, 3, and 4.

Figure 2C:
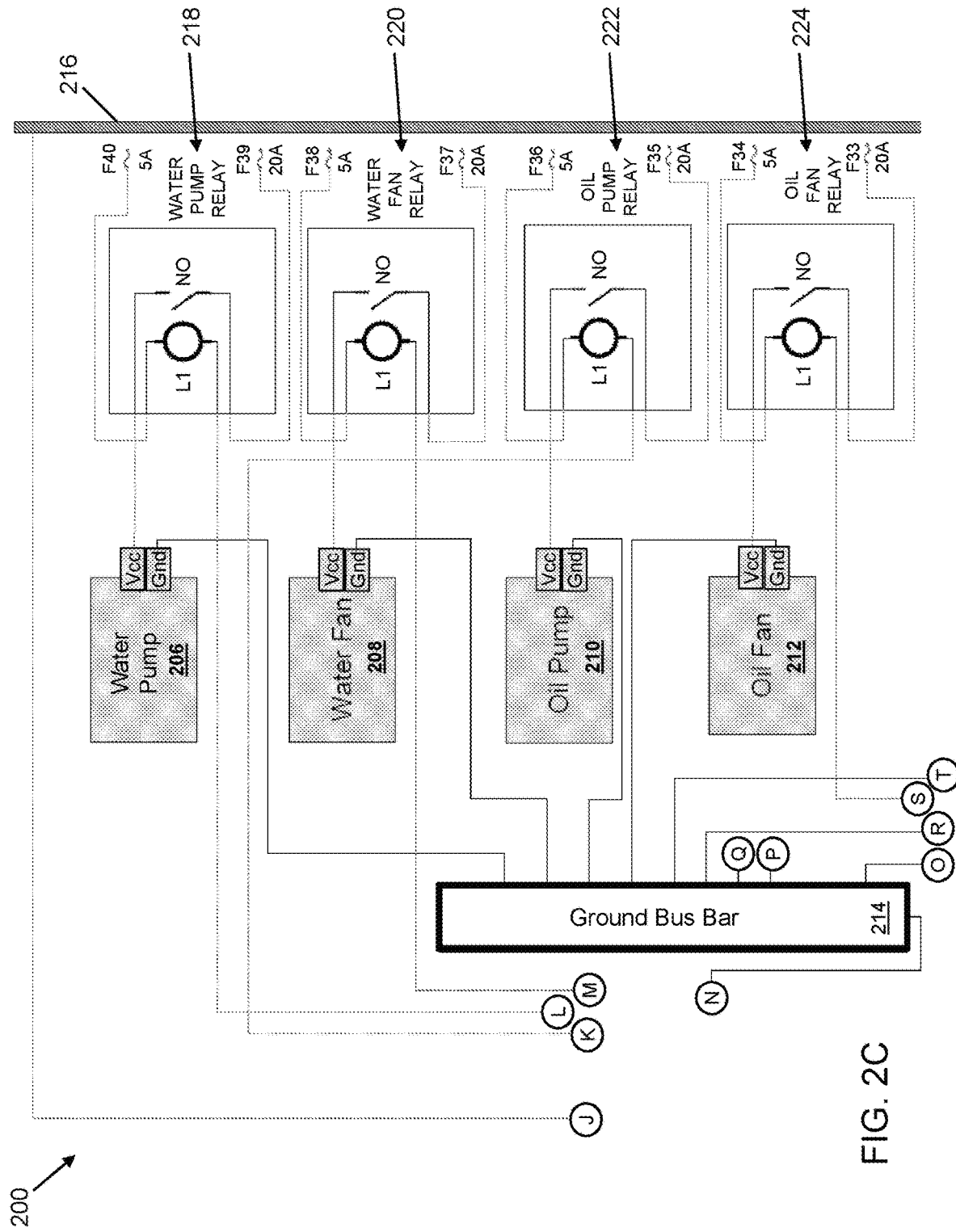
Figure 2D:
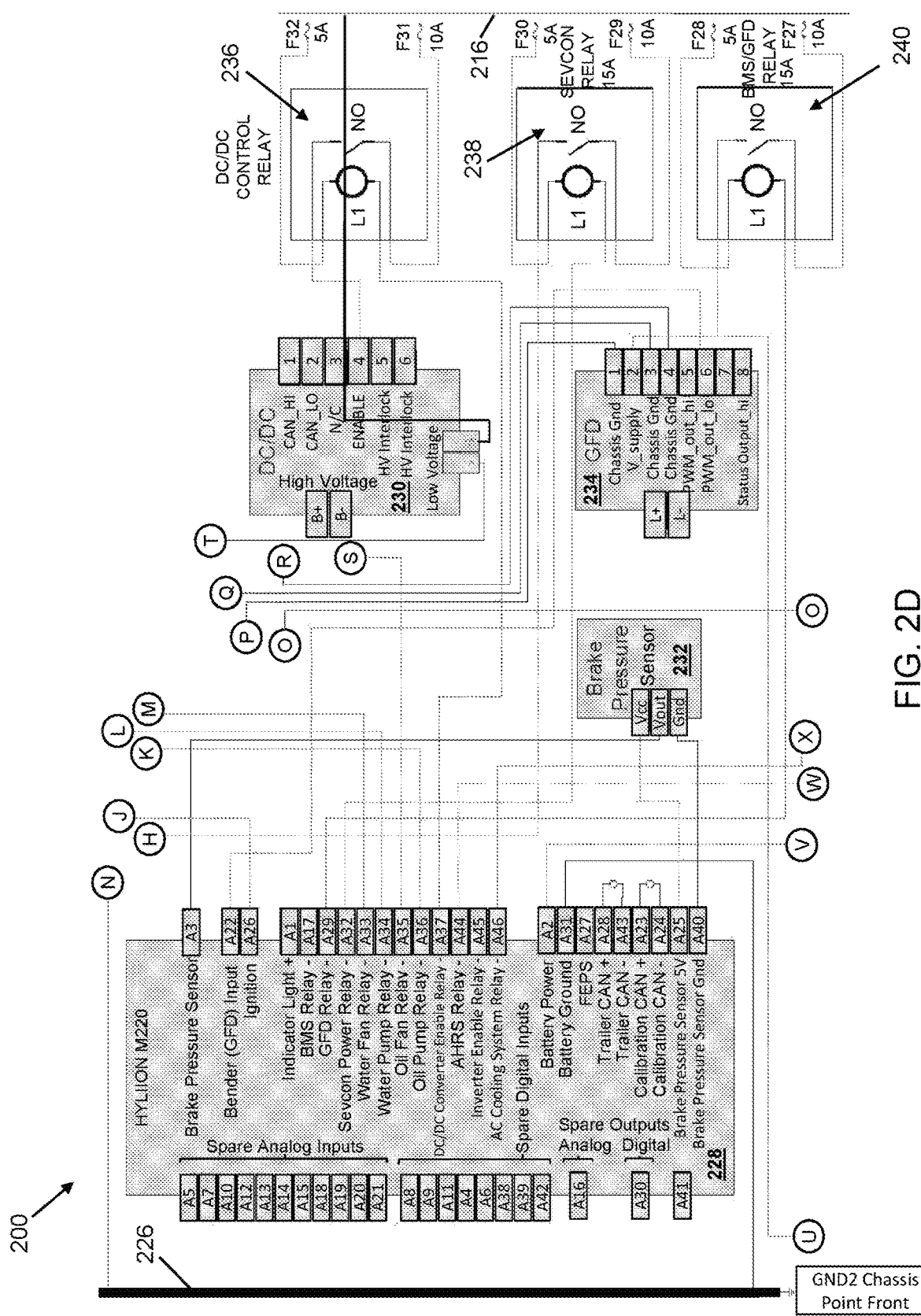

Referring first to FIGS. 2A-2F, illustrated therein is a control system circuit 200 that may be housed within the control system 150. It is noted that the control system circuit 200, and the components shown and described herein are merely exemplary, and other components and/or circuit architecture may be used without departing from the scope of this disclosure. FIG. 2A shows an AC motor controller 202, which may be used to actuate the electric motor-generator 130. By way of example, and in some cases, the AC motor controller 202 may include a Gen4 Size 8 controller manufactured by Sevcon USA, Inc. of Southborough, Mass. In some embodiments, the AC motor controller 202 is coupled to an AC motor controller relay 238 (FIG. 2D). As described below with reference to FIG. 3, the AC motor controller 202 may communicate with other components of the control system circuit 200 by way of a controller area network (CAN bus). FIG. 2B shows an electric motor-generator 204, which may be the electric motor-generator 130 discussed above, and which may be actuated by the AC motor controller 202. In some examples, the electric-motor generator 204 may include an electric motor-generator manufactured by Remy International, Inc. of Pendleton, Ind. FIG. 2C illustrates a water pump 206 coupled to a water pump relay 218, a water fan 208 coupled to a wafer fan relay 220, an oil pump 210 coupled to an oil pump relay 222, an oil fan 212 coupled to an oil fan relay 224, and a ground bus bar 214. Each of the water pump 206, the water fan 208, the oil pump 210, and the oil fan 212 may be coupled to a voltage supply 216 (and thus enabled) by way of their respective relay, where the relays are coupled to and actuated by a master control unit 228 (FIG. 2D). In addition, the ground bus bar 214 may be coupled to a ground plane 226 (FIG. 2D), and each of the water pump 206, the water fan 208, the oil pump 210, and the oil fan 212 may be coupled to the ground plane 226 by way of the ground bus bar 214.

Figure 2E:
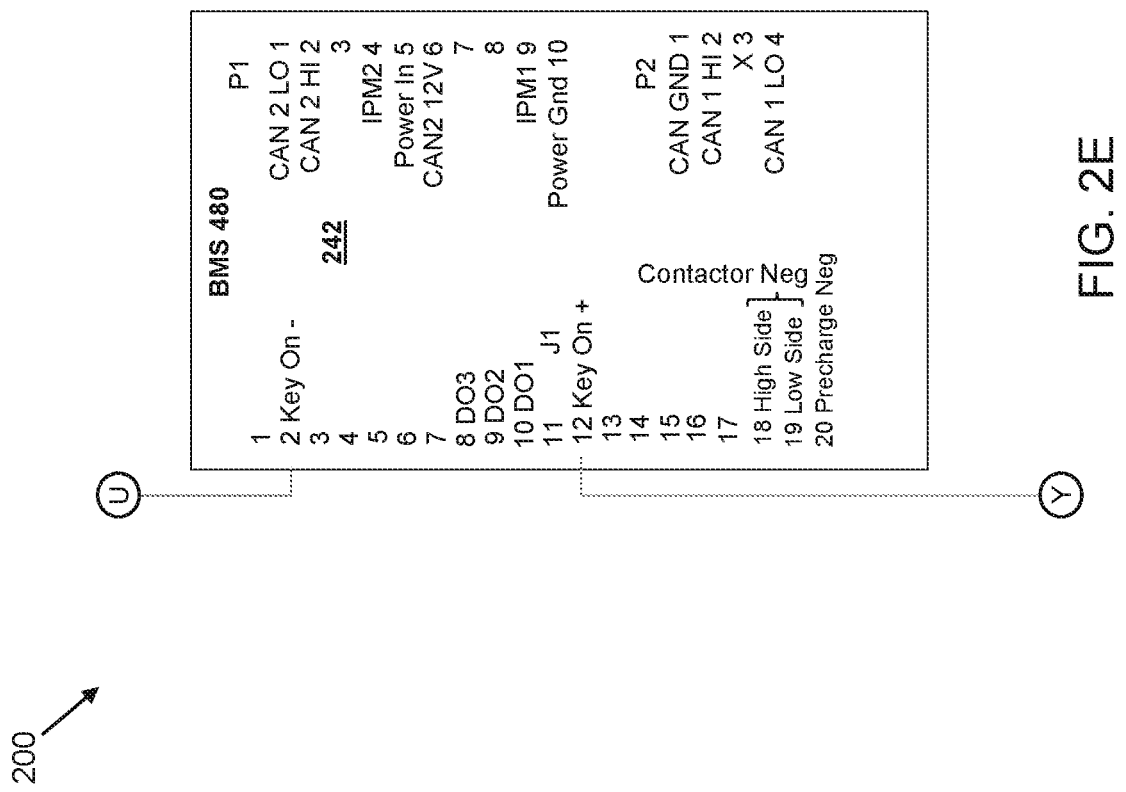
Figure 2F:
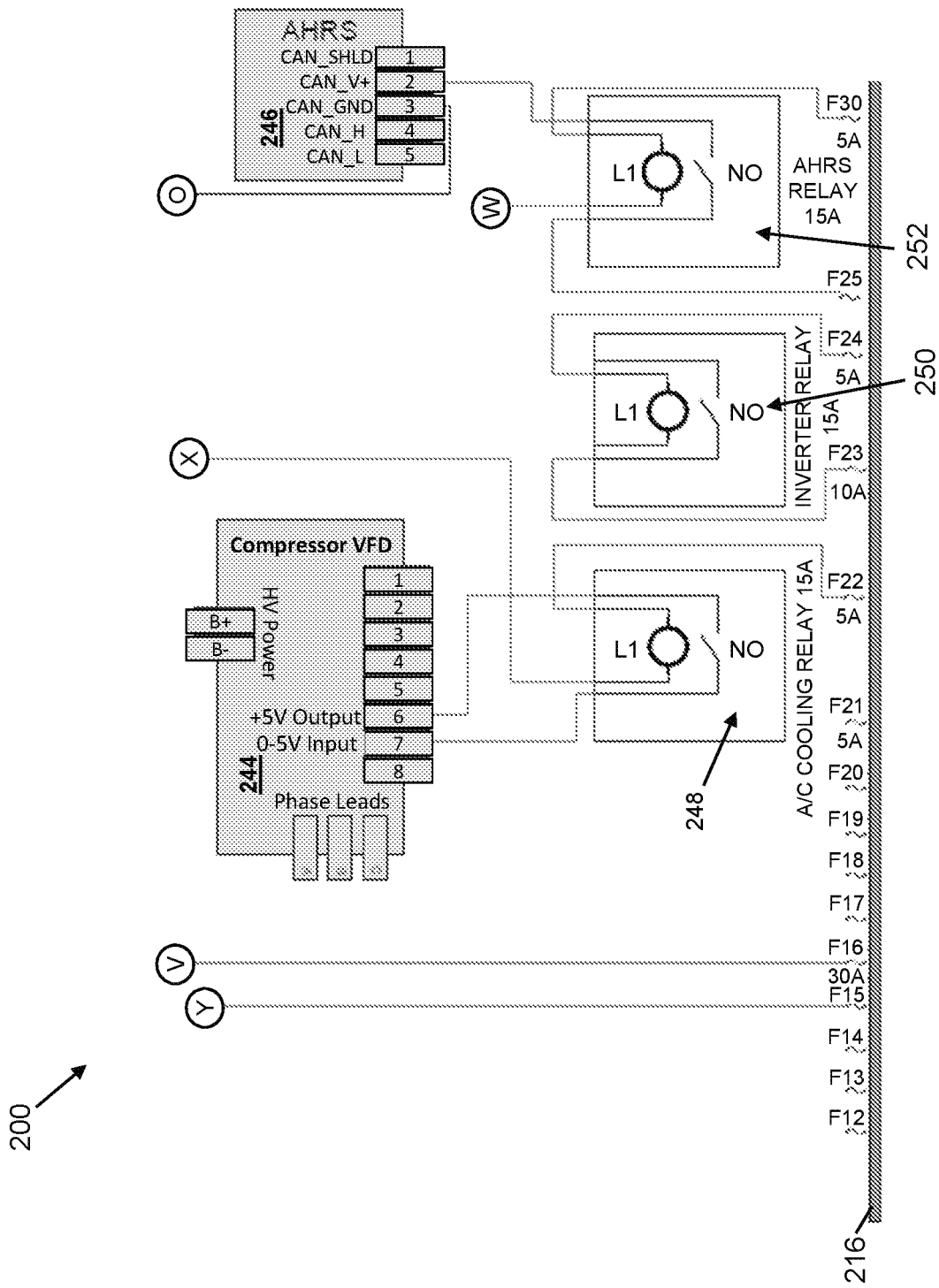

In addition to the master control unit 228, FIG. 2D illustrates a DC-DC power supply 230 coupled to a DC-DC control relay 236, a brake pressure sensor 232 coupled to the master control unit 228, a ground fault detector (GFD) 234 coupled to a battery management system (BMS)/GFD relay 240, and the AC motor controller relay 238. The DC-DC power supply 230 may be coupled to the voltage supply 216 (and thus enabled) by way of the DC-DC control relay 236, which is coupled to and actuated by a master control unit 228. Similarly, the GFD 234 and a "Key On-" input of a BMS 242 (FIG. 2E) may be coupled to the voltage supply 216 by way of the BMS/GFD relay 240, which is also coupled to and actuated by the master control unit 228. The AC motor controller 202 may also be coupled to the voltage supply 216 (and thus enabled) by way of the AC motor controller relay 238, which is also coupled to and actuated by the master control unit 228. In various embodiments, the DC-DC power supply 230 and the master control unit 228 may communicate with other components of the control system circuit 200 by way of the CAN bus, as discussed below. FIG. 2E shows the "Key On-" input of a BMS 242 coupled to the BMS/GFD relay 240, as discussed above. In addition, a "Key On+" input of the BMS 242 may be coupled directly to the voltage supply 216, as shown in FIG. 2F. In some embodiments, the BMS 242 may also communicate with other components of the control system circuit 200 by way of the CAN bus, as discussed below.

Referring specifically to FIG. 2F, illustrated therein is a compressor 244 coupled to a cooling relay 248, an attitude and heading reference system (AHRS) 246 coupled to an AHRS relay 252, and an optional inverter relay 250. By way of example, the compressor may include a variable frequency drive (VFD) or variable speed drive (VSD) compressor. The compressor 244 may be coupled to the voltage supply 216 (and thus enabled) by way of the cooling relay 248, which is coupled to and actuated by a master control unit 228. Similarly, the AHRS 246 may be coupled to the voltage supply 216 (and thus enabled) by way of the AHRS relay 252, which is coupled to and actuated by a master control unit 228. In some embodiments, the AHRS 246 may communicate with other components of the control system circuit 200 by way of the CAN bus, as discussed below. In various embodiments, the control system circuit 200 further includes an inverter, as shown below in FIG. 4, that may be coupled to the DC-DC power supply 230 and which may be optionally enabled/disabled using the inverter relay 250 by the master control unit 228. Moreover, in various embodiments, the inverter is coupled to the electric motor-generator 204 to provide power to, or receive power from, the electric motor-generator 204. It is again noted that the description of the control system circuit 200 is merely exemplary, and other aspects, advantages, and useful components will be evident to those skilled in the art, without departing from the scope of this disclosure. For example, in various embodiments, the control system circuit 200 may also include one or more of a fuse and relay module, a 12 volt battery, a fuse block, one or more battery disconnect switches, one or more electrical contactors, a pre-charge resistor, and/or other components as known in the art.

Figure 3:
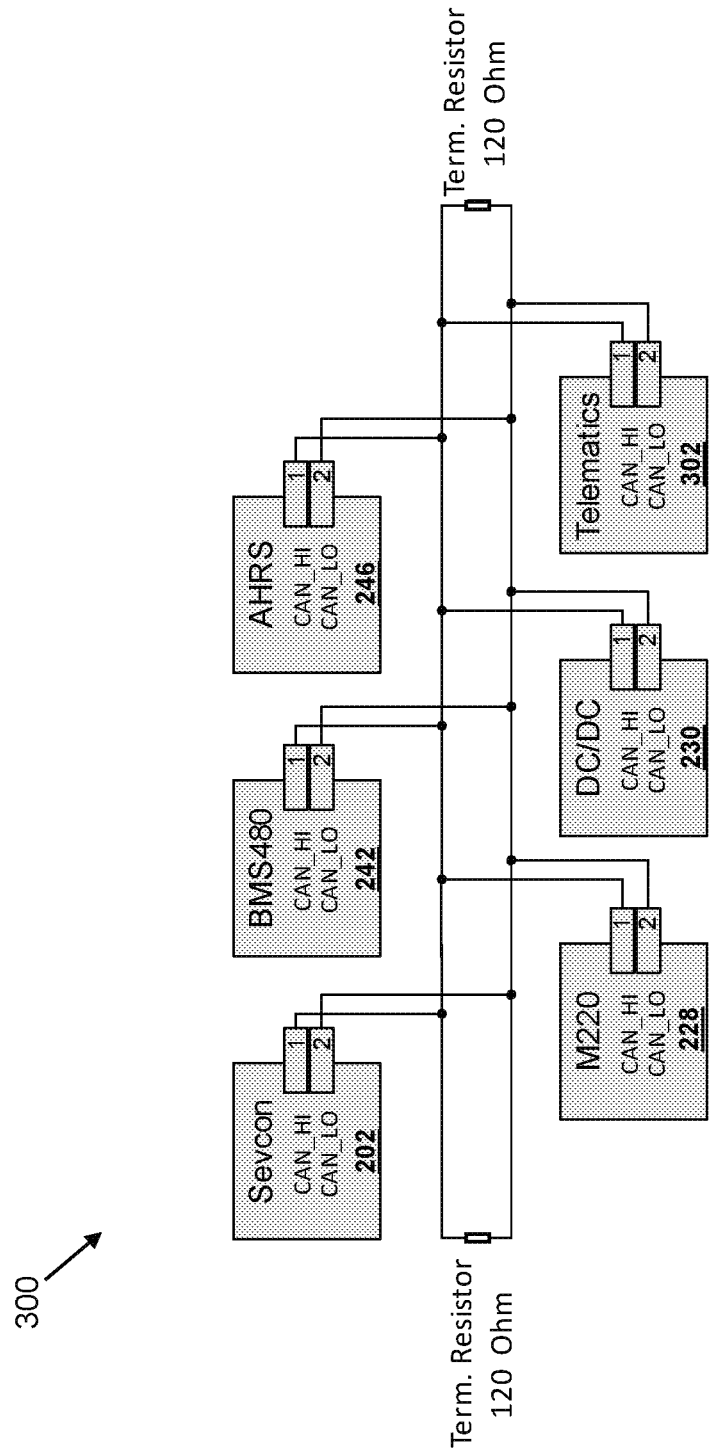
FIG. 3 depicts an exemplary controller area network (CAN bus) that may be used for communication of the various components of the control system circuit of FIGS. 2A-2F, in accordance with some embodiments.

With reference now to FIG. 3, illustrated therein is a controller area network (CAN bus) 300 used for communication of the various components of the control system circuit 200 with one another. Generally, a CAN bus is a vehicle bus standard designed to allow microcontrollers and other devices such as electronic control units (ECUs), sensors, actuators, and other electronic components, to communicate with each other in applications without a host computer. In various embodiments, CAN bus communications operate according to a message-based protocol. Additionally, CAN bus communications provide a multi-master serial bus standard for connecting the various electronic components (e.g., ECUs, sensors, actuators, etc.), where each of the electronic components may be referred to as a 'node'. In various cases, a CAN bus node may range in complexity, for example from a simple input/output (I/O) device, sensors, actuators, up to an embedded computer with a CAN bus interface. In addition, in some embodiments, a CAN bus node may be a gateway, for example, that allows a computer to communicate over a USB or Ethernet port to the various electronic components on the CAN network. In various embodiments, CAN bus nodes are connected to each other through a two wire bus (e.g., such as a 1200 nominal twisted pair) and may be terminated at each end by 120Ω resistors.

In particular, the CAN bus 300 is illustrated as a linear bus terminated at each end by 120Ω resistors. In some embodiments, the CAN bus 300 includes an ISO 11898-2 high speed CAN bus (e.g., up to 1 Mb/s). By way of example, the CAN bus 300 is shown as including as nodes, for example, the AC motor controller 202, the BMS 242, the AHRS 246 (sensor), the master control unit 228, the DC-DC power supply 230 (actuator), and telematics unit 302 (smart sensor). In some embodiments, the telematics unit 302 may include a global positioning system (GPS), an automatic vehicle location (AVL) system, a mobile resource management (MRM) system, a wireless communications system, a radio frequency identification (RFID) system, a cellular communications system, and/or other telematics systems. In some embodiments, the telematics unit 302 may also include the AHRS 246. In accordance with various embodiments, at least some of the sensors, actuators, and other electronic components which are not included (e.g., shown in FIG. 3) as CAN bus nodes, may themselves be coupled to the CAN bus 300 by way of one or more of the CAN bus nodes. For example, a voltage meter (sensor), a current meter (sensor), and one or more electrical contactors (actuators) may be coupled to the CAN bus 300 by way of the BMS 242. Similarly, the water pump 206 (actuator), the water fan 208 (actuator), the oil pump 210 (actuator), the oil fan 212 (actuator), the GFD 234 (sensor), an inverter, the brake pressure sensor 232, a trailer weight sensor, as well as other actuators, sensors, and/or electronic components may be coupled to the CAN bus 300 by way of the master control unit 228. In some examples, the electric motor-generator 204 (actuator) is coupled to the CAN bus 300 by way of the AC motor controller 202.

Figure 4:
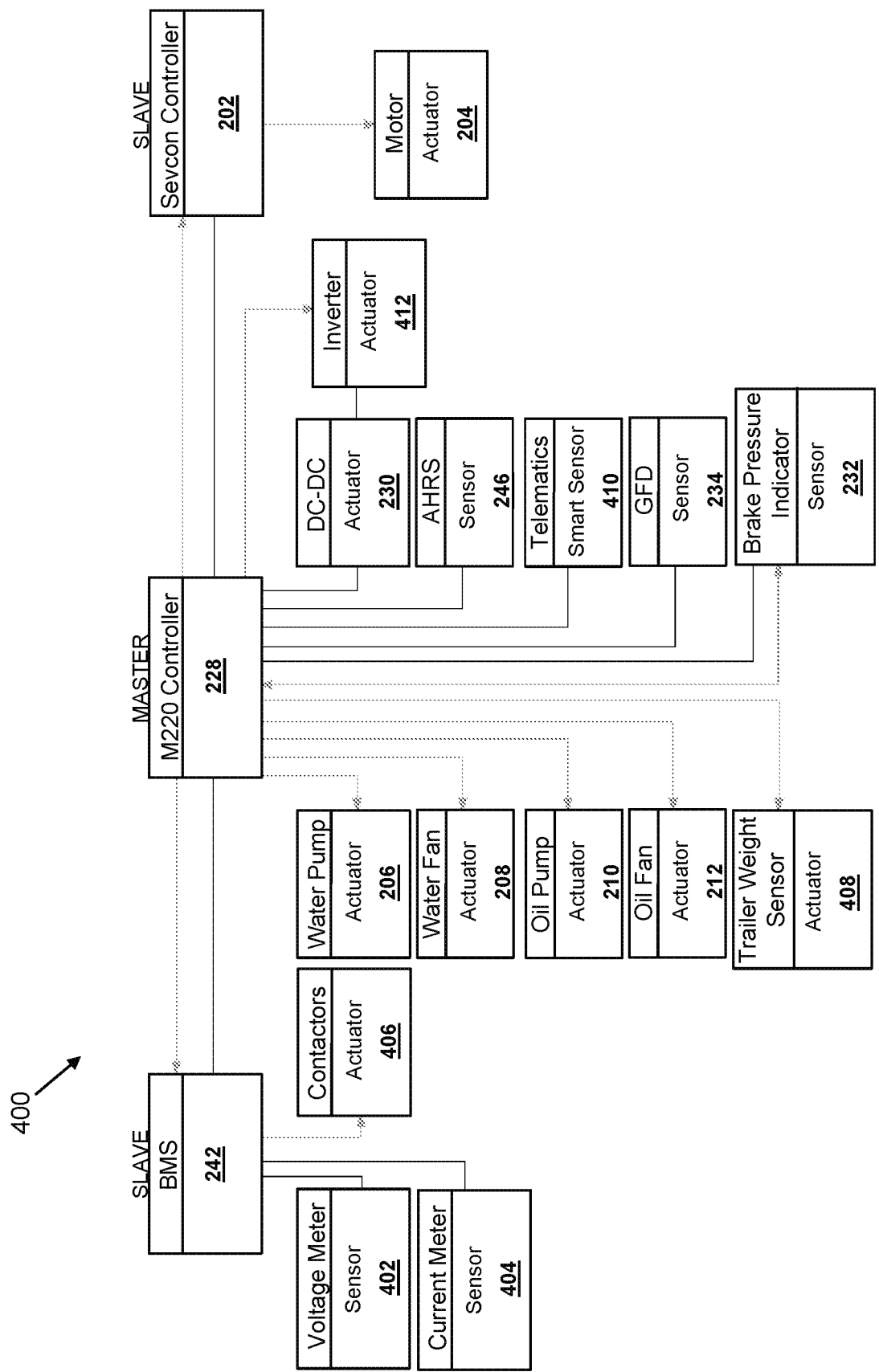
FIG. 4 is a functional block diagram of a hardware and/or software control system, in accordance with some embodiments.

Referring now to FIG. 4, illustrated therein is control system diagram 400 which provides further detail regarding connections and/or communication between and among the various control system components, some of which have been shown and described above (e.g., as part of the control system circuit 200 and/or the CAN bus 300). By way of example, the control system diagram 400 shows that the master control unit 228 is configured to operate as a 'Master' controller, while each of the BMS 242 and the AC motor controller 202 are configured to operate as 'Slave' controllers and are thereby under control of the master control unit 228. In some embodiments, and as illustrated in the control system diagram 400, the master control unit 228 provides for control (e.g., actuation of and/or receipt of a sensor output) for each of the water pump 206, the water fan 208, the oil pump 210, the oil fan 212, a trailer weight sensor 408, the DC-DC power supply 230, an inverter 412, the AHRS 246, a telematics unit 410, the GFD 234, and the brake pressure sensor 232. Additionally, the BMS 242 provides for control (e.g., actuation of and/or receipt of a sensor output) for each of a voltage meter 402, a current meter 404, and one or more electrical contactors 406. In some embodiments, the AC motor controller 202 provides for control (e.g., actuation) of the electric motor-generator 204, as discussed above.

Control Methods, Generally

Various aspects of the hybrid suspension system 100 and the adapted hybrid system 101 have been described above, including aspects of the control system architecture and related components. It particular, it has been noted that the hybrid suspension system 100 and the adapted hybrid system 101 are operated, by way of the control system 150 and suitable program code, in at least three modes of operation: (i) a power assist mode, (ii) a regeneration mode, and (iii) a passive mode. In at least some embodiments, the program code used to operate the control system 150 may reside on a memory storage device within the master control unit 228 (FIG. 2D). In addition, the master control unit 228 may include a microprocessor and/or microcontroller operable to execute one or more sequences of instructions contained in the memory storage device, for example, to perform the various methods described herein. In some cases, one or more of the memory storage, microprocessor, and/or microcontroller may reside elsewhere within the hybrid suspension system 100, within the adapted hybrid system 101, or even at a remote location that is in communication with the hybrid suspension system 100 or the adapted hybrid system 101. In some embodiments, a general purpose computer system (e.g., as described below with reference to FIG. 7) may be used to implement one or more aspects of the methods described herein.

Figure 5A:
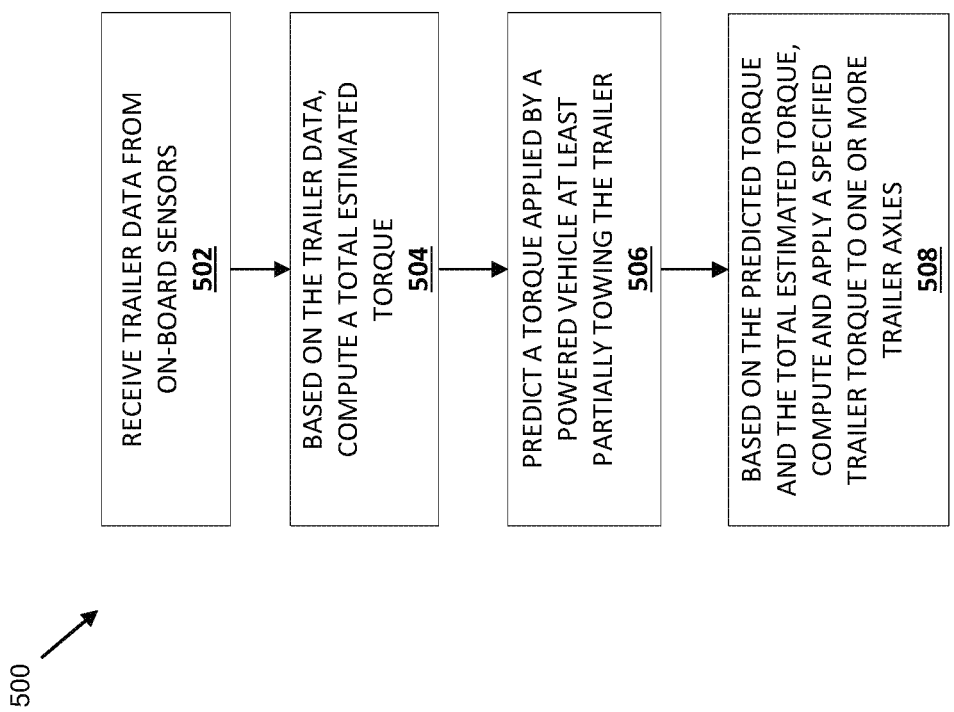
FIG. 5A is a flow diagram providing a method for controlling a hybrid suspension system and/or an adapted hybrid system, in accordance with some embodiments.

With reference now to FIG. 5A, illustrated therein is a method 500 of controlling a hybrid suspension system, such as the hybrid suspension system 100 and/or the adapted hybrid system 101 described above with reference to any of FIGS. 1A-1E. Generally, and in some embodiments, the method 500 provides a method for determining how much torque should be provided by the hybrid suspension system 100 and/or the adapted hybrid system 101, and as such in which mode to operate the hybrid suspension system 100 and/or the adapted hybrid system 101 (e.g., power assist, regeneration, or passive), in order to keep the hybrid suspension system 100, a trailer to which the hybrid suspension system 100 is coupled, and a powered vehicle towing the trailer, moving along their current trajectory at a substantially constant speed. Among other advantages, embodiments of the method 500 provide for a reduction in both fuel consumption and any associated vehicle emissions, and thus a concurrent improvement in fuel efficiency, of a powered vehicle towing the trailer, as well as improved vehicle acceleration, vehicle stability, and energy recapture (e.g., via regenerative braking).

It is also noted that while performing the method 500, aspects of the present disclosure may additionally receive data from, send data to, actuate, other otherwise interact with various components of the control system circuit 200 and the CAN bus 300, described above. Thus, one or more aspects discussed above may also apply to the method 500. Moreover, additional process steps may be implemented before, during, and after the method 500, and some process steps described above may be replaced or eliminated in accordance with various embodiments of the method 500.

Referring now to the method 500, the method 500 begins at block 502 where trailer data is received from one or more on-board sensors. As used herein, the term "on-board sensors" may be used to describe sensors that are coupled to or part of the hybrid suspension system 100, sensors that are coupled to or part of a trailer to which the hybrid suspension system 100 is attached, as well as remote sensors that may communicate (e.g., by way of cellular, wireless, RF, satellite, or other such communication) data to a receiver or transceiver that is coupled to or part of the hybrid suspension system 100 or the trailer. In some embodiments, the described sensors may be coupled to or part of the adapted hybrid system 101 and/or may be coupled to or part of the tractor 165 to which the adapted hybrid system 101 is attached. In various embodiments, the sensors may include one or more of a brake pressure sensor (e.g., such as the brake pressure sensor 232), an altitude and heading reference system (e.g., such as the AHRS 246), one or more smart sensors (e.g., such as the telematics unit 302) which may include a global positioning system as well as other smart sensors and/or telematics systems as described above, a trailer weight sensor which may include an air bag pressure sensor or other type of weight sensor, a speed sensor, a gyroscope, an accelerometer, a magnetometer, a lateral acceleration sensor, a torque sensor, an inclinometer, and/or other suitable sensor. In various embodiments, the sensed trailer data is sent to the master control unit 228 for further processing. For example, in some embodiments, the received trailer data (e.g., the sensor output) may be filtered to smooth the sensor data and thereby mitigate anomalous sensor values. In some cases, such filtering and smoothing may be accomplished using moving averages and Kalman filters, although other smoothing and/or filtering techniques may also be used. In at least some examples, an estimated braking torque is obtained from the brake pressure sensor, an estimated weight of the trailer is obtained from the air bag pressure sensor, and a trailer acceleration and roadway incline are both obtained from the AHRS.

The method 500 then proceeds to block 504 where based at least in part on the trailer data, a total estimated torque is computed. In some embodiments, the total estimated torque includes an estimated torque to maintain movement of the hybrid suspension system 100, and a trailer to which the hybrid suspension system 100 is coupled, along their current trajectory at a substantially constant speed. In embodiments when the trailer is at least partially towed by a powered vehicle, the total estimated torque further includes an estimated torque to maintain movement of the hybrid suspension system 100, the coupled trailer, and the powered vehicle, along their current trajectory at a substantially constant speed. For purposes of this discussion, the hybrid suspension system 100, the coupled trailer, and the powered vehicle may be collectively referred to as "a hybrid trailer vehicle system (HTVS)". Thus, in some embodiments, the tractor-trailer vehicle 160 of FIG. 1C may be referred to as an HVTS. In some embodiments, for example when the tractor 165 is driven without the attached trailer, the total estimated torque may include an estimated torque to maintain movement of the tractor 165 (e.g., the powered vehicle) along its current trajectory at a substantially constant speed. In some embodiments, when the trailer is at least partially towed by a powered vehicle, one or more computations may be performed with respect to each of the hybrid suspension system 100 and the adapted hybrid system 101 so as to cooperatively determine an estimated torque to be applied at each of the hybrid suspension system 100 and the adapted hybrid system 101 to maintain movement of the HTVS along its current trajectory at a substantially constant speed.

In an embodiment of block 504, computing the total estimated torque may include computing one or more of a plurality of forces acting on the HTVS. For example, computing the total estimated torque may include computing a driver input torque (e.g., throttle/braking of the powered vehicle), an air drag torque, a road drag torque, a road grade torque, and an acceleration torque, among others. In some embodiments, the air drag torque and the road drag torque may be dependent on a speed at which the HTVS is traveling. In some cases, the road grade torque may be dependent on an incline/decline of a roadway on which the HTVS is traveling. By way of example, the driver of the powered vehicle of the HTVS may actuate an air brake system. In such cases, embodiments of the present disclosure may utilize an air brake pressure to calculate a braking torque component of the total estimated torque. In some embodiments, the driver input torque may be substantially equal to a sum of the air drag torque, the road drag torque, the road grade torque, and the acceleration torque. In various embodiments, the total estimated torque computed at block 504 may include a currently-applied (e.g., instantaneous) HTVS torque. Based in part on the total estimated torque and an estimate and/or prediction of a driver-applied torque, as discussed in more detail below, a specified torque may be applied by way of the hybrid suspension system 100 to one or more trailer axles. Moreover, in some embodiments and based in part on the total estimated torque and an estimate and/or prediction of a driver-applied torque, a specified torque may be applied by way of one or both of the hybrid suspension system 100 and the adapted hybrid system 101.

The method 500 then proceeds to block 506 where a torque applied by a powered vehicle towing the trailer is computationally estimated (e.g., by the control system 150). Stated another way, in embodiments of block 506, a torque applied by a driver of the powered vehicle (e.g., by applying throttle or braking) is estimated, for example, as a result of the hybrid suspension system 100 being autonomous from the powered vehicle and thus not having direct feedback regarding driver inputs (e.g., throttle/braking). In some embodiments, a driver-applied torque may also be estimated, for example, by the adapted hybrid system 101. In some embodiments, the driver-applied torque may also be predicted. Thus, in some examples, a currently-applied torque may be estimated and a subsequently applied torque may be predicted. In some embodiments, the estimated and/or predicted driver-applied torque may be based on a plurality of factors such as past driver behavior, current driver behavior, road conditions, traffic conditions, weather conditions, and/or a roadway grade (e.g., road incline or decline). As used herein, the term "driver behavior" may be used to describe a driver's operation of the powered vehicle, for example, including application of throttle, braking, steering, as well as other driver-controlled actions. Additionally, and in various embodiments, at least some of the factors used to estimate and/or predict the driver-applied torque may include data received from one or more of the on-board sensors, described above, including GPS or inclinometer data that may be used to determine a present roadway grade and/or predict an upcoming roadway grade. For example, if the upcoming roadway grade includes a positive grade (e.g., an incline), the driver may in some embodiments be expected to apply additional throttle. In some cases, if the upcoming roadway grade includes a negative grade (e.g., a decline), the driver may in some embodiments be expected to apply the brakes (e.g., of the powered vehicle). In some embodiments, if the upcoming roadway grade is substantially flat, the driver may in some embodiments be expected to neither apply additional throttle nor apply the brakes. In some examples, at least some of the factors used to estimate and/or predict the applied torque may further include traffic data, weather data, road data, or other similar data. Similarly, if the upcoming roadway includes heavy traffic, poor road conditions (e.g., pot holes, unpaved sections, etc.), or if weather has caused hazardous driving conditions (e.g., rain, flooding, strong crosswinds, etc.), the driver may in some embodiments be expected to apply the brakes. Thus, in accordance with some embodiments, knowledge of an upcoming roadway grade, combined with a plurality of other data (e.g., traffic, weather, road data) and the driver's current and/or past behavior may be used to estimate and/or predict the driver-applied torque. It will be understood that the driver behaviors discussed above, with respect to roadway grade and road/weather conditions, are merely exemplary. Various other behaviors (e.g., apply throttle during a negative grade or apply brakes during a positive grade) are possible as well, without departing from the scope of the present disclosure.

The method 500 then proceeds to block 508 where based at least in part on the estimated and/or predicted torque (block 506) and the total estimated torque (block 504), a specified trailer torque is computed and applied to one or more of the trailer axles. In some cases, a torque to apply to the electric axle of the tractor 165 is computed and applied. In particular, the specified trailer torque is applied to the one or more of the trailer axles by way of the hybrid suspension system 100, as described herein. In some cases, based at least in part on the estimated and/or predicted torque (block 506) and the total estimated torque (block 504), a specified torque may be computed and applied to the electric axle of the tractor 165 by way of the adapted hybrid system 101. Additionally, in an embodiment of block 508, the hybrid suspension system 100 and/or the adapted hybrid system 101 are operated in the appropriate one of the at least three modes of operation (e.g., power assist, regeneration, or passive) in order to provide the specified trailer torque and/or torque to the electric axle of the tractor 165. In some embodiments, the specified trailer torque, or torque to apply to the electric axle of the tractor 165 is computed, at least in part, by plugging in the estimated and/or predicted driver-applied torque into an energy optimization algorithm that utilizes an equivalent consumption minimization strategy (ECMS) to simultaneously optimize the fuel consumption of the powered vehicle and the energy usage (e.g., battery charge) of the hybrid suspension system 100 and/or the adapted hybrid system 101.

An aspect of the energy optimization algorithm is illustrated in more detail in FIG. 5B, which provides a method 550. In some embodiments, the method 550 may be performed as part of, or in addition to, the method 500. For example, in some cases, the method 550 may be performed as part of block 508 of the method 500, where the specified torque is computed and applied to the one or more trailer axles, and/or to the electric axle of the tractor 165. By way of example, the method 550 begins at block 552 where a first plurality of torques that may be applied by the powered vehicle, and a second plurality of torques that may be applied at the trailer, and/or at the electric axle of the tractor 165 (e.g., applied by the electric motor-generator), are determined. In some embodiments, the first plurality of torques may include a range of torque values which the powered towing vehicle is capable of providing (e.g., by way of a fuel-consuming engine, an electric motor, or other means of providing a motive force). Similarly, and in some embodiments, the second plurality of torques may include a range of torque values which the hybrid suspension system 100 and/or the adapted hybrid system 101 is capable of providing (e.g., by way of the energy storage system and the electric motor-generator coupled to one or more drive axles or electric axles).

The method 550 then proceeds to block 554, where the first plurality of torques is mapped onto a fuel usage map. For example, in some embodiments, a difference between the total estimated torque (block 504) and the second plurality of torques (e.g., each torque of a range of possible torque values which the hybrid suspension system 100 and/or the adapted hybrid system 101 can provide) is determined, where the difference provides a set of corresponding torque values that would be provided by the powered vehicle (e.g., by the engine of the powered vehicle). In various embodiments, the set of corresponding torque values may be used to generate a torque-to-fuel usage map for the powered vehicle. At block 556 of the method 550, the second plurality of torques may be used to similarly generate a torque-to-energy usage map for the hybrid suspension system 100 and/or the adapted hybrid system 101.

Thereafter, at block 558 of the method 550, an optimal combination of a first torque from the first plurality of torques, and a second torque from the second plurality of torques, is selected. By way of example, and in an embodiment of block 558, the torque-to-energy usage map may be converted to another torque-to-fuel usage map, so that mappings of the powered vehicle and the hybrid suspension system 100 and/or the adapted hybrid system 101 may be more readily compared. In some cases, the torque-to-fuel usage map corresponding to the hybrid suspension system 100 and/or the adapted hybrid system 101 is subtracted from the torque-to-fuel usage map corresponding to the powered vehicle (e.g., the engine of the powered vehicle), thereby resulting in a combined powered vehicle/hybrid suspension system usage map. Thereafter, in some embodiments, an optimal (e.g., minimum) fuel usage from the combined usage map is determined, including a corresponding index value. In some cases, the corresponding index value is then used to select an optimal torque value for the hybrid suspension system 100 and/or the adapted hybrid system 101 from the torque-to-energy usage map, and the optimal torque value for the hybrid suspension system 100 and/or the adapted hybrid system 101 is applied, in an embodiment of both blocks 508 and 558. In a more general sense, embodiments of the present disclosure may be used to estimate a current torque demand of the HTVS. Using the estimated torque demand, at least some embodiments may be used to determine an amount of fuel efficiency gain (e.g., of the powered vehicle) and/or energy efficiency gain (e.g., of the hybrid suspension system 100 and/or the adapted hybrid system 101) that may be achieved by operating the hybrid suspension system 100 and/or the adapted hybrid system 101 in a particular mode, while applying a particular torque, thereby providing for selection of the optimal torque value for the hybrid suspension system 100 and/or the adapted hybrid system 101.

Figure 6A:
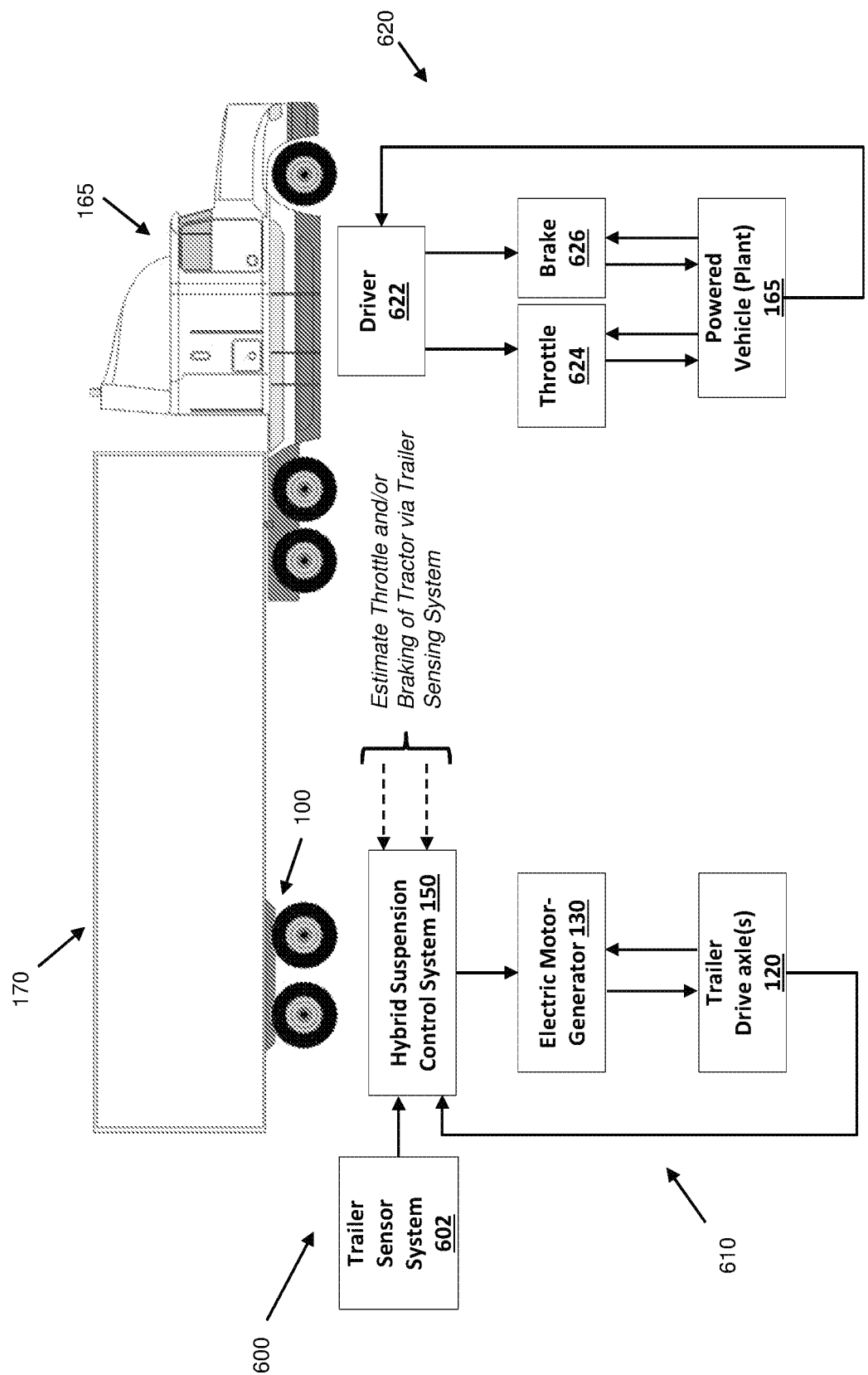
FIG. 6A is an exemplary functional block diagram for controlling the hybrid suspension system, in accordance with some embodiments.

With reference now to FIG. 6A, illustrated therein is an exemplary functional block diagram 600 for controlling the hybrid suspension system 100, described above. In particular, the block diagram 600 illustrates exemplary relationship, in at least some embodiments, among various components of an HVTS, such as the tractor-trailer vehicle 160 of FIG. 1C. Moreover, at least some aspects of the methods 500, 550, discussed above, may be better understood with reference to FIG. 6A. For example, FIG. 6A illustrates the autonomous nature of the hybrid suspension system 100, where the hybrid suspension system 100 is able to operate without direct commands or signals from the powered towing vehicle (e.g., such as the tractor 165), to independently gain information about itself, the trailer 170, and the environment (e.g., by way of the trailer sensing system), and to make decisions and/or perform various functions based on one or more algorithms stored in the control system 150.

The autonomous nature of the hybrid suspension system 100 is further exemplified, in at least some embodiments, by the functional block diagram 600 including two separate control loops, a hybrid suspension system control loop 610 and a powered towing vehicle control loop 620. In the powered vehicle control loop 620, a driver 622 may apply a throttle 624 or a brake 626, which is then applied to the powered vehicle (e.g., such as the tractor 165). In various embodiments, a response of the powered vehicle to the applied throttle 624/brake 626 (e.g., acceleration/deceleration of the powered vehicle) may be provided as feedback to the driver 622, which the driver 622 may then further respond to by applying additional throttle 624 or brake 626, or neither throttle 624/brake 626. In some examples, the powered vehicle may also provide feedback (e.g., to the driver 622) via throttle 624/brake 626 inputs.

Independent from the powered vehicle control loop 620, the hybrid suspension control loop 610 may operate in a substantially similar manner to the methods 500, 550 described above. For example, in at least some embodiments, the hybrid suspension control system 150 may receive trailer data from a trailer sensor system 602, which may include any of the one or more sensors discussed above. In some cases, the trailer sensor system 602 may include the on-board sensors discussed above. In some embodiments, the control system 150 may compute a total estimated torque and computationally estimate a torque applied by the powered vehicle 165 (e.g., which may include estimating throttle and/or braking). In some embodiments, based on the total estimated torque and the computationally estimated torque of the powered vehicle, a specified trailer torque may be computed and applied to the one or more trailer axles 120, by way of the electric motor-generator 130. In various examples, the driven one or more trailer axles 120 may provide feedback to the control system 150, for further computation and application of torque. In some cases, the one or more driven trailer axles 120 may also provide feedback to the electric motor-generator 130. In at least some embodiments, the hybrid suspension system 100 may sense one or more pneumatic brake lines from the powered vehicle.

Figure 6B:
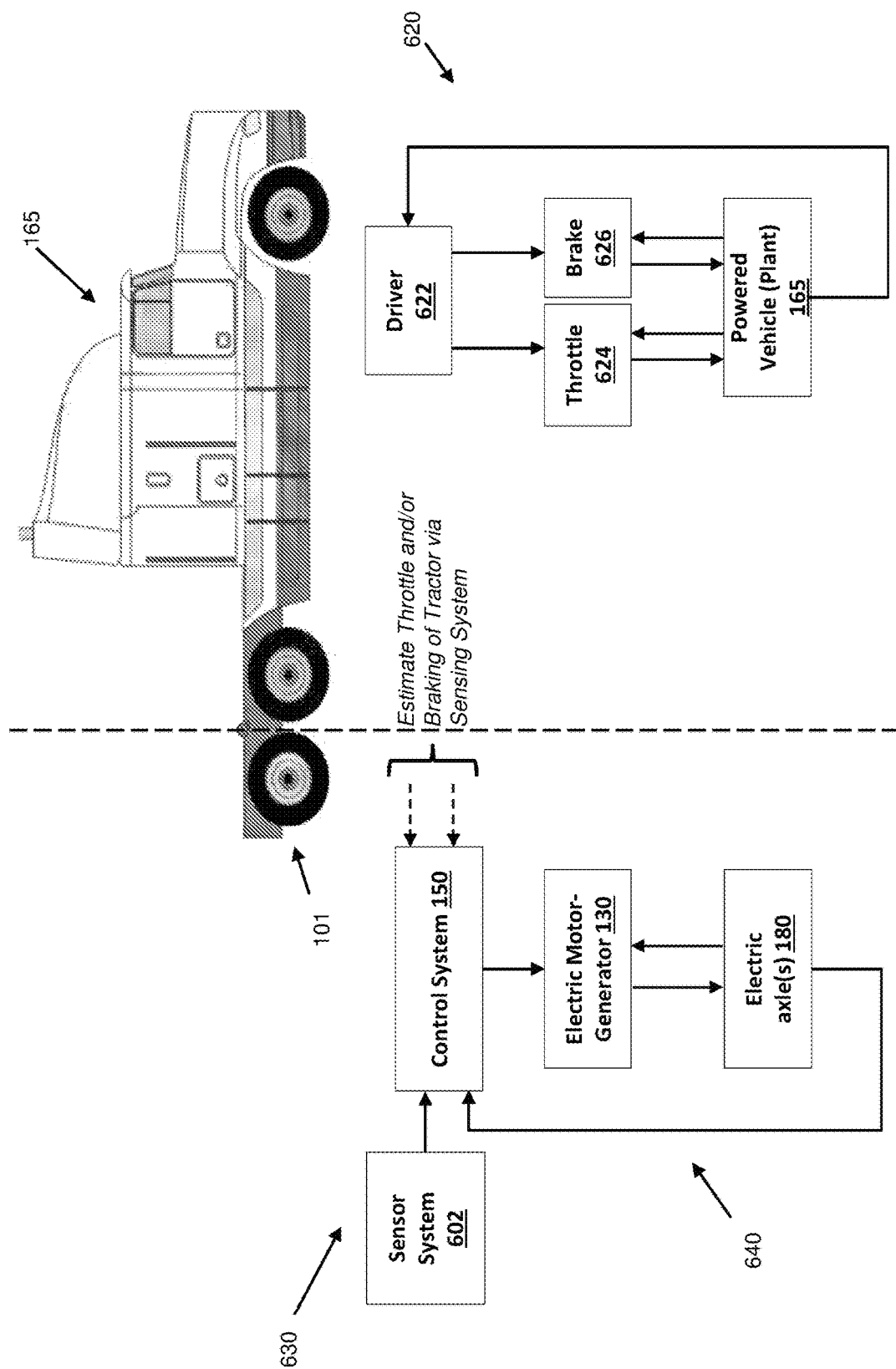
FIG. 6B is an exemplary functional block diagram for controlling the adapted hybrid system, in accordance with some embodiments.

Referring to FIG. 6B, illustrated therein is an exemplary functional block diagram 630 for controlling the adapted hybrid system 101, described above. In particular, the block diagram 630 illustrates exemplary relationship, in at least some embodiments, among various components of a tractor, such as the tractor 165 of FIG. 1D or 1E. Some aspects of the methods 500, 550, discussed above, may be further elaborated upon and understood with reference to FIG. 6B. For example, FIG. 6B illustrates the autonomous nature of the adapted hybrid system 101, where the adapted hybrid system 101 is able to operate without direct commands or signals from the driver or other components of the powered vehicle, to independently gain information about itself, the tractor 165, and the environment (e.g., by way of the sensing system), and to make decisions and/or perform various functions based on one or more algorithms stored in the control system 150. To be sure, in some embodiments, the adapted hybrid system 101 may retrieve and/or share data, for example, via the CAN bus of the tractor 165.

The autonomous nature of the adapted hybrid system 101 is further exemplified, in at least some embodiments, by the functional block diagram 630 including two separate control loops, an adapted hybrid system control loop 640 and the powered vehicle control loop 620, which is substantially as described above. Independent from the powered vehicle control loop 620, the adapted hybrid system control loop 640 may operate in a substantially similar manner to the methods 500, 550 described above. For example, in at least some embodiments, the control system 150 may receive tractor data from a sensor system 602 (e.g., which may be part of the adapted hybrid system 101 and/or coupled to the tractor 165), which may include any of the one or more sensors discussed above. In some cases, the sensor system 602 may include the on-board sensors discussed above. In some embodiments, the control system 150 may compute a total estimated torque and computationally estimate a torque applied by the engine of the tractor 165. In some embodiments, based on the total estimated torque and the computationally estimated torque of the powered vehicle, a specified torque may be computed and applied to one or more electric axles of the tractor 165, by way of one or more electric motor-generators 130, as shown in FIGS. 1D and 1E. In various examples, the electric axle of the tractor 165 may provide feedback to the control system 150, for further computation and application of torque. In some cases, the one or more electric axles of the tractor 165 may also provide feedback to the one or more electric motor-generators 130. In at least some embodiments, the adapted hybrid system 101 may sense one or more pneumatic brake lines.

Figure 6C:
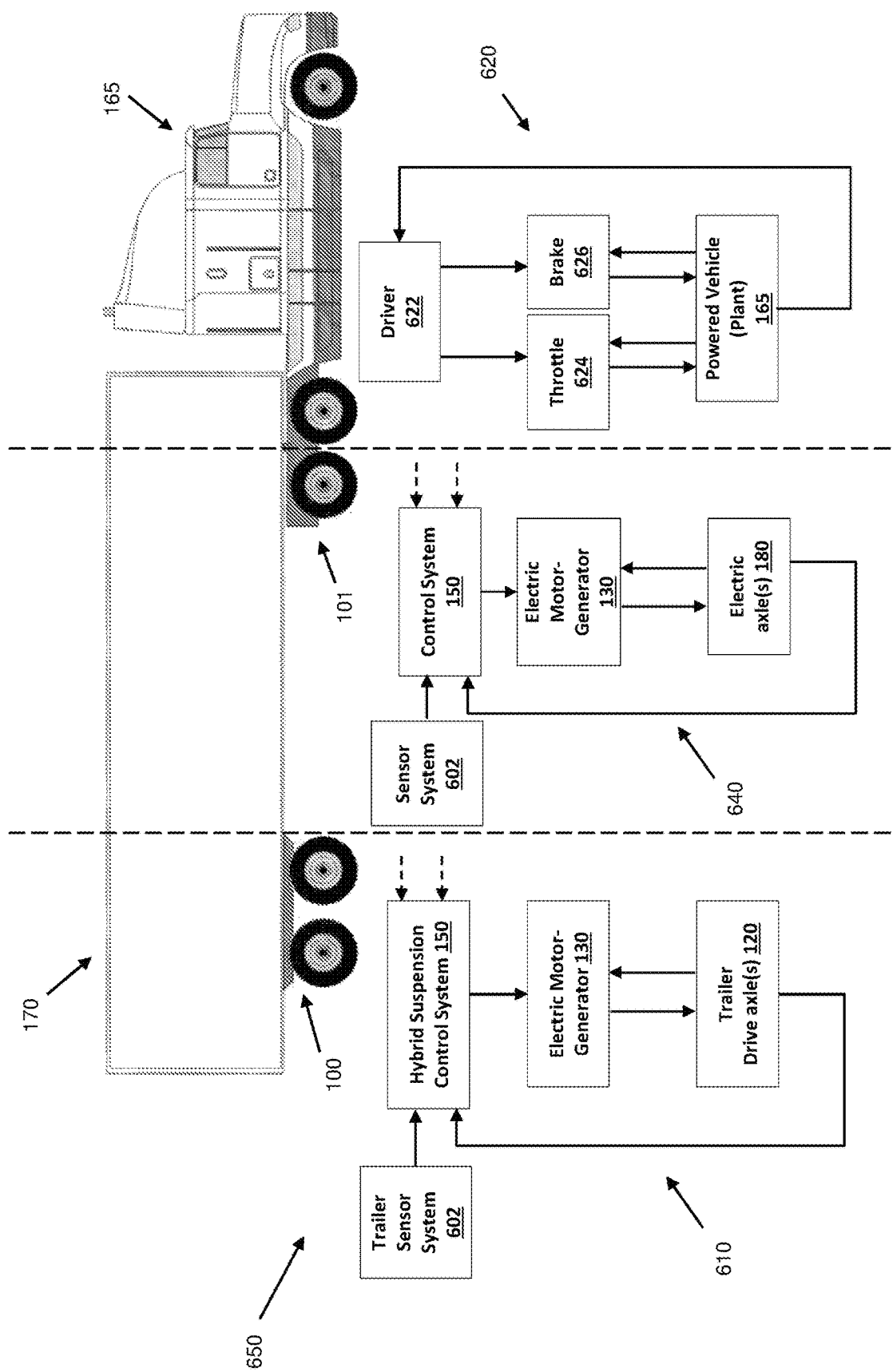
FIG. 6C is an exemplary functional block diagram for controlling both the hybrid suspension system and the adapted hybrid system, in accordance with some embodiments.

With reference to FIG. 6C, illustrated therein is an exemplary functional block diagram 650 for controlling both the hybrid suspension system 100 and the adapted hybrid system 101, described above. In particular, the block diagram 650 illustrates exemplary relationship, in at least some embodiments, among various components an HVTS, where the hybrid suspension system 100 and the adapted hybrid system 101 may be cooperatively operated. Some aspects of the methods 500, 550, discussed above, may be further elaborated upon and understood with reference to FIG. 6C.

In particular, the cooperative operation of the hybrid suspension system 100 and the adapted hybrid system 101, together with the powered vehicle engine, is illustrated by the functional block diagram 650. As shown in FIG. 6C, the functional block diagram 650 includes three separate control loops, the hybrid suspension system control loop 610, the adapted hybrid system control loop 640, and the powered vehicle control loop 620. Independent from the powered vehicle control loop 650, each of the hybrid suspension control loop 610 and the adapted hybrid system control loop 640 may operate in a substantially similar manner as described above. In some embodiments, the hybrid suspension system control loop 610 and the adapted hybrid system control loop 640 may share a control system 150 (e.g., housed within one of the hybrid suspension system 100 or the adapted hybrid system 101), or each of the control loops 610, 640 may utilize separate control systems 150 (e.g., housed within each of the hybrid suspension system 100 and the adapted hybrid system 101). Moreover, in some embodiments, the control system 150 may receive sensor data from the sensor system 602, where the sensors may be housed and/or coupled to one or more of the trailer, the tractor, the hybrid suspension system 100, and the adapted hybrid system 101.

In various embodiments, the control system 150 may compute a total estimated torque and computationally estimate a torque applied by the engine of the tractor 165. In some embodiments, based on the total estimated torque and the computationally estimated torque of the powered vehicle (e.g., the engine of the tractor 165), a specified torque may be computed and applied to one or more electric axles of the tractor 165, as well as to the one or more trailer axles 120, by way of one or more electric motor-generators 130. In various examples, the electric axle of the tractor 165 and the one or more trailer axles 120 may provide feedback to the control system 150, for further computation and application of torque. In some cases, the one or more electric axles of the tractor 165 and the one or more trailer axles 120 may also provide feedback to the one or more electric motor-generators 130.

Control Methods, Examples and Further Discussion

The hybrid suspension system 100 and/or the adapted hybrid system 101 may be used, for example together with aspects of the control methods described above, to operate in a variety of different modes (e.g., power assist, regeneration, and passive modes) and thus perform a variety of different functions. In various examples, the hybrid suspension system 100 and/or the adapted hybrid system 101 may be used to provide a power boost (e.g., to the HVTS) during acceleration and/or when going up an incline by operating in the power assist mode, thereby depleting energy from the energy storage system. In addition, the hybrid suspension system 100 and/or the adapted hybrid system 101 may replenish that energy by operating in the regeneration mode (e.g., using regenerative braking) when decelerating and/or when going down a decline. As discussed above, operation in one of the various modes may be determined according to a variety of inputs and/or data (e.g., from sensors, calculated values, etc.) such as discussed above. In various examples, the hybrid suspension system 100 and/or the adapted hybrid system 101 and associated methods may provide, among other benefits, optimal application of power (e.g., as discussed in the example below), increased fuel mileage, decreased fuel emissions, and superior load stabilization. Of particular note, embodiments of the hybrid suspension system 100 described herein are configured to operate independently of the powered vehicle to which the trailer may be attached. Thus, any type of powered vehicle may hook up and tow a trailer, including the hybrid suspension system 100 attached thereunder, and the hybrid suspension system 100 will automatically adapt to the powered vehicle's behavior. Similarly, embodiments of the adapted hybrid system 101 are configured to replace a passive axle of any type of tractor with an electric axle, as described above, and independent operate and adapt to the behavior (e.g., throttle/braking) of the tractor.

With respect to optimal application of power as discussed above, there are scenarios in which battery power could be used most effectively at a given time, for example, knowing that battery power may be (i) regenerated in the near future (e.g., based on an upcoming downhill roadway grade) or (ii) needed in the near future (e.g., based on an upcoming uphill roadway grade). Such information (e.g., regarding the upcoming roadway) may be gathered from GPS data, inclinometer data, and/or other sensor data as described above. In some embodiments, the hybrid suspension system 100 and/or the adapted hybrid system 101 may alternatively and/or additionally periodically query a network server, or other remote sever/database, to provide an upcoming roadway grade.

For purposes of illustration, consider an example where an HTVS is traveling along substantially flat terrain, while the battery array 140 of the hybrid suspension system 100 is at about a 70% state of charge (SOC). Consider also that there is an extended downhill portion of roadway coming up that would provide for regeneration about 40% SOC of the battery array 140 (e.g., while operating the hybrid suspension system 100 in the regeneration mode). Absent knowledge of the upcoming extended downhill portion of the roadway, some embodiments may operate in the passive mode on the substantially flat terrain, while beginning to regenerate the battery array 140 once the HTVS reaches the extended downhill portion of roadway. In such cases, about 30% SOC may be regenerated before the battery array 140 is fully charged. Thus, the system may not be able to regenerate further, and about 10% SOC that could have been captured may be lost.

In some embodiments, the predictive road ability discussed herein provides knowledge of the upcoming extended downhill portion of roadway. As such, the hybrid suspension system 100 may autonomously engage the power assist mode while traveling along the substantially flat terrain, such that about 10% SOC of the battery array 140 is used prior to reaching the extended downhill portion of roadway, thereby improving fuel efficiency of the HTVS (e.g., while on the substantially flat terrain), while still regenerating about 30% SOC while traveling along the extended downhill portion. Such system operation, including the predictive road ability, advantageously provides for both improved fuel efficiency of the HTVS efficient use of the battery array 140 (e.g., as it may be undesirable to have the battery array nearly full or nearly empty when there is an opportunity to regenerate or provide power assistance).

In another example, consider a case where the battery array 140 is at about 10% SOC and the HTVS is traveling along substantially flat terrain. Consider also that an extended uphill portion of roadway is coming up that would optimally be able to use about 20% SOC of the battery array 140 (e.g., while operating the hybrid suspension system 100 in the power assist mode). Once again, absent knowledge of the upcoming extended uphill portion of the roadway, some embodiments may operate in the passive mode on the substantially flat terrain, while beginning to use energy (e.g., operating in the power assist mode) once the HTVS reaches the extended uphill portion of the roadway. Thus, in such an example, the battery array 140 may expend its 10% SOC before the hybrid suspension system 100 may not be able to assist further. Stated another way, about 10% SOC that could have been effectively used by the HTVS while traveling along the extended uphill portion of the roadway is not available.

As discussed above, the predictive road ability provides knowledge of the upcoming extended downhill portion of roadway. As such, the hybrid suspension system 100 may autonomously engage the regeneration mode while traveling along the substantially flat terrain, such that about 10% SOC of battery array 140 is regenerated, for a total of about 20% SOC, prior to reaching the extended uphill portion of the roadway. While this may result in a temporary decrease in fuel efficiency, the efficiency gains afforded by operating the hybrid suspension system 100 in the power assist mode for the duration of the extended uphill portion of the roadway (e.g., and optimally using the 20% SOC of the battery array 140) outweigh any potential efficiency reductions that may occur by regenerating on the substantially flat terrain. While the examples above were described primarily with reference to the hybrid suspension system 100, it will be understood that similar predictive road ability, and associated benefits, may be similarly employed using the adapted hybrid system 101.

In addition to using the various sensors, data, networking capabilities, etc. to determine whether the HTVS is traveling along substantially flat terrain, uphill, or downhill, embodiments of the present disclosure may be used to determine whether the HTVS is hitting a bump or pothole, turning a corner, and/or accelerating. By accounting for dynamics of the trailer and measuring angles and accelerations (e.g., in 3-dimensional space), embodiments of the present disclosure may provide for measurement of: (i) acceleration, deceleration, and angle of inclination of the trailer (e.g., by taking readings lengthwise), (ii) side-to-side (e.g., turning force) motion and banking of a roadway (e.g., by taking readings widthwise), (iii) smoothness of the roadway, pot holes, and/or wheels riding on a shoulder (side) of the road (e.g., by taking readings vertically). Utilizing such information, embodiments of the present disclosure may be used to brake wheels individually, for example, while still supplying power (e.g., by the power assist mode) to other wheels, thereby increasing trailer stability. In addition, and in some embodiments, by monitoring the acceleration, axle speed and incline of the roadway over time and by applying an incremental amount of torque and measuring the response in real time, the controller may back-calculate a mass of the trailer load. In some embodiments, a weight sensor may also be used, as described above. In either case, such information may be used by the system for application of a proper amount of torque to assist in acceleration of the HTVS without over-pushing the powered vehicle.

In some examples, the system may further be used to monitor one or more pneumatic brake lines, such that embodiments of the present disclosure provide a 'fail safe' mode where the hybrid suspension system 100 and/or the adapted hybrid system 101 will not accelerate (e.g., operate in a power assist mode) while a driver (e.g. of the powered vehicle) is actuating a brake system. In various embodiments, by monitoring feedback pressure of each wheel's brake lines, as well as their respective wheel speeds, the present system can determine how each brake for a particular wheel is performing. Thus, in various examples, embodiments of the present disclosure may provide for braking and/or powering of different wheels independently from one another for increased trailer stability. In some cases, this may be referred to as "torque vectoring". By way of example, such torque vectoring embodiments may be particularly useful when there are differences in roadway surfaces upon which each of a plurality of wheels of the HTVS is traveling (e.g., when roadway conditions are inconsistent, slippery, rough, etc.).

In various embodiments, embodiments disclosed herein may further be employed to recapture energy via regenerative braking, as described above. In some examples, the application of the brakes, and/or various combinations of deceleration, axle speed, trailer weight and incline/decline readings may dictate, at least in part, an ability and amount of regeneration possible by the hybrid suspension system 100 and/or the adapted hybrid system 101. In various embodiments, regenerative braking may persist until the energy storage system is fully charged, until a predetermined minimum level of stored energy has been achieved, or until the powered trailer axle has reached a minimum threshold rotational speed. Additionally, for example in some extreme conditions, different amounts of braking may be be applied to each wheel in order to reduce a potential of jack-knifing or other dangerous conditions during operation of the HTVS. As a whole, regenerative braking may be used to lighten a load on a mechanical braking system (e.g., on the powered vehicle and/or on the trailer), thereby virtually eliminating a need for a loud compression release engine brake system (e.g., Jake brake system). In some cases, by applying both regenerative braking and friction braking, the HTVS may be able to brake much faster and have shorter stopping distances. In addition, and in various embodiments, the present system may be deployed with two pneumatic brake lines (e.g., which may including existing brake lines), while an entirety of the controls (e.g., including sensor input processing, mode of operation control, aspects of the various methods described above, and other decision-making controls) may reside entirely within the hybrid suspension system 100 and/or the adapted hybrid system 101 itself (e.g., and in many respects, within the control system 150).

Computer System for Implementing the Various Methods

Figure 7:
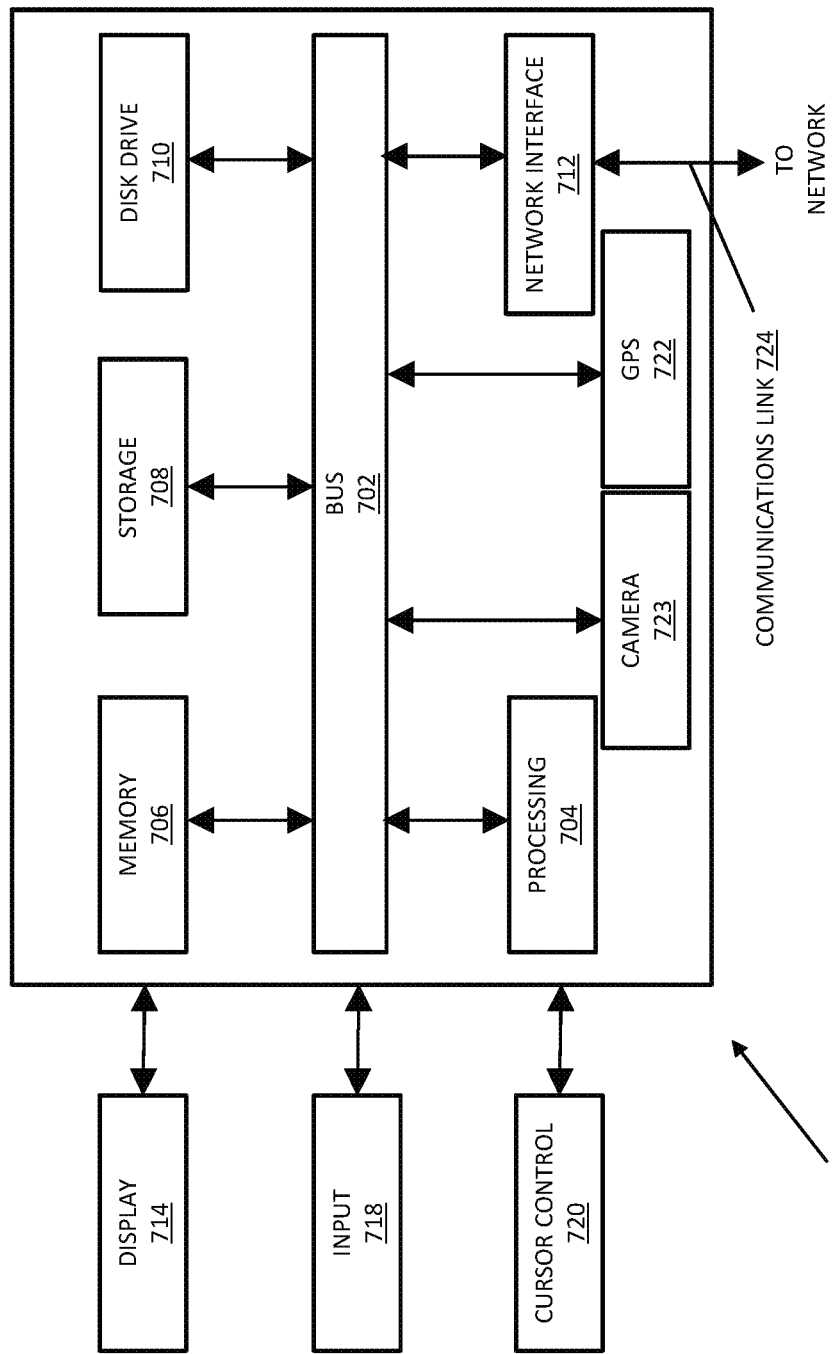
FIG. 7 illustrates an embodiment of an exemplary computer system suitable for implementing various aspects of the control system and methods of FIGS. 5A and 5B, in accordance with some embodiments.

Referring now to FIG. 7, an embodiment of a computer system 700 suitable for implementing various aspects of the control system 150 and methods 500, 550, is illustrated. It should be appreciated that any of a variety of systems which are used for carrying out the methods described herein, as discussed above, may be implemented as the computer system 700 in a manner as follows.

In accordance with various embodiments of the present disclosure, computer system 700, such as a computer and/or a network server, includes a bus 702 or other communication mechanism for communicating information, which interconnects subsystems and components, such as a processing component 704 (e.g., processor, micro-controller, digital signal processor (DSP), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), a location determination component 722 (e.g., a Global Positioning System (GPS) device as illustrated, a cell tower triangulation device, and/or a variety of other location determination devices known in the art), and/or a camera component 723. In one implementation, the disk drive component 710 may comprise a database having one or more disk drive components.

In accordance with embodiments of the present disclosure, the computer system 700 performs specific operations by the processor 704 executing one or more sequences of instructions contained in the memory component 706, such as described herein with respect to the control system 150 and methods 500, 550. Such instructions may be read into the system memory component 706 from another computer readable medium, such as the static storage component 708 or the disk drive component 710. In other embodiments, hard-wired circuitry may be used in place of or in combination with software instructions to implement the present disclosure.

Logic may be encoded in a computer readable medium, which may refer to any medium that participates in providing instructions to the processor 704 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 710, volatile media includes dynamic memory, such as the system memory component 706, and transmission media includes coaxial cables, copper wire, and fiber optics, including wires that comprise the bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 700. In various other embodiments of the present disclosure, a plurality of the computer systems 700 coupled by a communication link 724 to a network (e.g., such as a LAN, WLAN, PTSN, and/or various other wired or wireless networks, including telecommunications, mobile, and cellular phone networks) may perform instruction sequences to practice the present disclosure in coordination with one another.

The computer system 700 may transmit and receive messages, data, information and instructions, including one or more programs (i.e., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

What is claimed is:

1. A vehicle, comprising:
   a fuel-fed engine and plural drive axles attached to a vehicle frame, wherein at least one of the drive axles is coupled via a drivetrain to the fuel-fed engine to drive at least a pair of wheels;
   at least one other of the drive axles being an electrically-powered drive axle configured to supply supplemental torque to one or more additional wheels of the vehicle and to thereby supplement, while the vehicle travels over a roadway, primary motive forces applied through the drivetrain;
   an energy store on the vehicle, the energy store configured to supply the electrically powered drive axle with electrical power and further configured to receive energy recovered via use of the drive axle in a regenerative braking mode of operation;
   a heating, ventilation or cooling (HVC) system on the vehicle, wherein the HVC system is an auxiliary system, substantially separate from a main heating ventilating or cooling system of the vehicle and is coupled to receive electrical power from the energy store; and
   a control system operable to adjust operation of the vehicle to one of a plurality of modes of operation, wherein a first mode of operation comprises the electrically-powered drive axle providing supplemental torque, a second mode of operation comprises the electrically-powered drive axle recovering energy using regeneration, and a third mode of operation comprises the energy store providing electric power to the HVC system, wherein the HVC system regulates temperature within at least a portion of a cabin of the tractor unit without an idle of the fuel-fed engine.

2. The vehicle of claim 1, wherein the tractor unit is a 6.times.2 tractor unit retrofitted to replace an otherwise dead axle of a tandem pair with the electrically powered drive axle.

3. The vehicle of claim 1, wherein the retrofitted electrically-powered drive axle is coupled to a brake line of the tractor unit and is configured to control the regenerative braking mode of operation.

4. The vehicle of claim 1, wherein the energy store includes:
   a battery;
   a battery management system configured to controllably maintain a desired state of charge (SoC) of the energy store during the over-the roadway travel; and
   a heat exchanger configured to moderate temperature of the battery during the over-the-roadway travel.

5. The vehicle of claim 4, wherein the heat exchanger includes a fluid-air heat exchanger exposed to airflow during over-the-roadway travel and coupled into a compressor-based loop configured to subambient cool the battery at least during the over-the-roadway travel, the compressor-based loop further configured to subambient cool the cabin of the tractor unit, at least selectively during a stopover operation, via a fluid-air heat exchanger of the HVC system.

6. The vehicle of claim 4, wherein the energy store further includes at least one additional electrical storage device having discharge rate and/or capacity characteristics that differ from the battery; and wherein the battery management system controllably maintains the desired SoC including states of charge of the battery and of the at least one additional electrical storage device.

7. The vehicle of claim 6, wherein the at least one additional electrical storage device includes either or both of an ultracapacitor and additional battery-type storage.

8. The vehicle of claim 4, further comprising an in-cabin control interface coupled to the battery management system, the control interface including:
   an in-cabin display of state of charge for the energy store; and
   mode control configured to selectively control an operation mode of the battery management system, wherein in at least one selectable mode, energy recovered via the electrically-powered drive axle in the regenerative braking mode is used to bring the energy store to a substantially full state of charge, wherein in at least another selectable mode, state of charge is managed to a dynamically varying level based on actual or predicted requirements for supplemental motive forces during over-the roadway travel.

9. The vehicle of claim 1, further comprising: an inverter coupled between the energy store and an in-cabin electrical power interface to supply auxiliary AC power in the cabin of the vehicle during stopover operation.

10. A vehicle, comprising:
 a fuel-fed engine and plural drive axles attached to a vehicle frame, wherein at least one of the drive axles is coupled via a drivetrain to the fuel-fed engine to drive at least a pair of wheels;
 at least one other of the drive axles being an electrically-powered drive axle configured to supply supplemental torque to one or more additional wheels of the vehicle and to thereby supplement, while the vehicle travels over a roadway, primary motive forces applied through the drivetrain;
 an energy store on the vehicle, the energy store configured to supply the electrically powered drive axle with electrical power and further configured to receive energy recovered via use of the drive axle in a regenerative braking mode of operation;
 a heating, ventilation or cooling (HVC) system on the vehicle, wherein the HVC system is an auxiliary system, substantially separate from a main heating ventilating or cooling system of the vehicle and is coupled to receive electrical power from the energy store; and
 a control system operable to adjust operation of the vehicle to one of a plurality of modes of operation, wherein a first mode of operation comprises the electrically-powered drive axle providing supplemental torque, a second mode of operation comprises the electrically-powered drive axle recovering energy using regeneration, and a third mode of operation comprises, without an idle of the fuel-fed engine, the energy store providing electric power to the HVC system, wherein the HVC system regulates temperature within at least a portion of a cabin of the tractor unit.

11. The vehicle of claim 10, wherein the tractor unit is a 6.times.2 tractor unit retrofitted to replace an otherwise dead axle of a tandem pair with the electrically powered drive axle.

12. The vehicle of claim 10, wherein the retrofitted electrically-powered drive axle is coupled to a brake line of the tractor unit and is configured to control the regenerative braking mode of operation.

13. The vehicle of claim 10, wherein the energy store includes:
 a battery;
 a battery management system configured to controllably maintain a desired state of charge (SoC) of the energy store during the over-the roadway travel; and
 a heat exchanger configured to moderate temperature of the battery during the over-the-roadway travel.

14. The vehicle of claim 13, wherein the heat exchanger includes a fluid-air heat exchanger exposed to airflow during over-the-roadway travel and coupled into a compressor-based loop configured to subambient cool the battery at least during the over-the-roadway travel.

15. The vehicle of claim 13, wherein the energy store further includes at least one additional electrical storage device having discharge rate and/or capacity characteristics that differ from the battery; and wherein the battery management system controllably maintains the desired SoC including states of charge of the battery and of the at least one additional electrical storage device.

16. The vehicle of claim 15, wherein the at least one additional electrical storage device includes either or both of an ultracapacitor and additional battery-type storage.

17. The vehicle of claim 13, further comprising an in-cabin control interface coupled to the battery management system, the control interface including:
 an in-cabin display of state of charge for the energy store; and
 mode control configured to selectively control an operation mode of the battery management system, wherein in at least one selectable mode, energy recovered via the electrically-powered drive axle in the regenerative braking mode is used to bring the energy store to a substantially full state of charge, wherein in at least another selectable mode, state of charge is managed to a dynamically varying level based on actual or predicted requirements for supplemental motive forces during over-the roadway travel.

18. The vehicle of claim 10, further comprising: an inverter coupled between the energy store and an in-cabin electrical power interface to supply auxiliary AC power in the cabin of the vehicle without an idle of the fuel fed engine.

* * * * *